(12) United States Patent
Larson et al.

(10) Patent No.: US 6,779,721 B2
(45) Date of Patent: Aug. 24, 2004

(54) SYSTEMS AND METHODS FOR MANAGING SECURITY AT PLURAL PHYSICAL LOCATIONS

(75) Inventors: Steve A. Larson, West Linn, OR (US); Timothy J. Chinn, Tigard, OR (US); Ronald W. Miller, Beaverton, OR (US); Syed J. Mahmud, Hillsboro, OR (US)

(73) Assignee: Eid Access, Inc., Beaverton, OR (US)

( * ) Notice: Subject to any disclaimer, the term of this patent is extended or adjusted under 35 U.S.C. 154(b) by 0 days.

(21) Appl. No.: 10/365,137

(22) Filed: Feb. 11, 2003

(65) Prior Publication Data

US 2004/0056089 A1 Mar. 25, 2004

Related U.S. Application Data

(60) Provisional application No. 60/412,382, filed on Sep. 20, 2002.

(51) Int. Cl.[7] ................................................. G06K 5/00
(52) U.S. Cl. .................... 235/382; 235/380; 235/382.5; 235/381; 705/9; 705/11; 705/26; 340/5.2; 340/5.21
(58) Field of Search ............................... 235/380, 382, 235/382.5; 705/11, 26, 9; 340/5.21, 5.2

(56) References Cited

U.S. PATENT DOCUMENTS

| | | | | |
|---|---|---|---|---|
| 4,980,679 A | * | 12/1990 | Klaubert ...................... 345/50 |
| 6,394,356 B1 | * | 5/2002 | Zagami ....................... 235/487 |
| 6,408,337 B1 | * | 6/2002 | Dietz et al. .................. 709/229 |
| 6,507,826 B1 | * | 1/2003 | Maners ......................... 705/34 |
| 6,640,246 B1 | * | 10/2003 | Gary et al. .................. 709/223 |
| 2001/0041994 A1 | * | 11/2001 | Kim ................................ 705/5 |
| 2002/0052773 A1 | * | 5/2002 | Kraemer et al. ............... 705/9 |
| 2002/0072960 A1 | * | 6/2002 | Dabbiere ...................... 705/11 |
| 2003/0097273 A1 | * | 5/2003 | Carpenter et al. ............. 705/1 |

* cited by examiner

Primary Examiner—Jared J. Fureman
Assistant Examiner—Allyson N. Trail
(74) Attorney, Agent, or Firm—Kolisch Hartwell, P.C.

(57) ABSTRACT

Methods and systems for managing personnel security at physical locations. One such method includes managing personnel security for a plurality of different sponsor entities from an administrator entity. The method includes obtaining screening data from a plurality of different vendor entities and individuals associated with those vendor entities, where the screening data is obtained to screen the vendor entities and individuals to determine whether physical access to facilities of the sponsor entities should be granted. The method further includes performing background checks on the outside companies and their employees based on the screening data, where the background checks are initiated by the administrator entity using a computer-based system operated and maintained by the administrator entity.

7 Claims, 18 Drawing Sheets

Fig. 11 Entity-Level Background Check

SYSTEMS AND METHODS FOR MANAGING SECURITY AT PLURAL PHYSICAL LOCATIONS

CROSS-REFERENCE TO PRIORITY APPLICATION

This application is based upon and claims the benefit under 35 U.S.C. § 119 of the following U.S. provisional patent application, which is hereby incorporated by reference in its entirety for all purposes: Ser. No. 60/412,382, filed Sep. 20, 2002.

BACKGROUND

Many different types of security systems have been deployed in workplaces and other physical locations. In recent years, employee security cards have been increasingly used in connection with physical security systems implemented by employers. Often, the security cards will include photographs and relevant personal data, and in some cases will also include biometric data to permit verification of the cardholder's identity. This data typically is also stored on a computerized in-house security system, along with more extensive data relating to the employee. The security cards may be used to monitor and control access to the employer's physical facilities, via interfacing the security cards with card reader equipment deployed at various locations within the employer's facility. Common examples of such monitoring and control include tracking employee movements through various access points, and allowing only specified individuals to access particular areas.

Although systems such as that described above are often adequate in the case of employees, typically there are a variety of individuals other than employees that may have frequent and relatively unrestricted access to the employer's physical location. For example, employers commonly contract with outside entities to perform maintenance, cleaning, provide food service, etc., such that individuals employed by or associated with those outside entities have nearly unrestricted access to the employer's facilities. The security concerns are as great in respect to these individuals as they are with employees. Despite this, employers commonly do not have cost-effective or convenient mechanisms for screening outside parties and applying on-site security systems to those parties.

SUMMARY

Accordingly, methods and systems are provided for managing personnel security. One such method includes managing personnel security for a plurality of different sponsor entities from an administrator entity. The method includes obtaining screening data from a plurality of different vendor entities and individuals associated with those vendor entities, where the screening data is obtained to screen the vendor entities and individuals to determine whether physical access to facilities of the sponsor entities should be granted. The method further includes performing background checks on the outside companies and their employees based on the screening data, where the background checks are initiated by the administrator entity using a computer-based system operated and maintained by the administrator entity.

DETAILED DESCRIPTION

Figure 1:
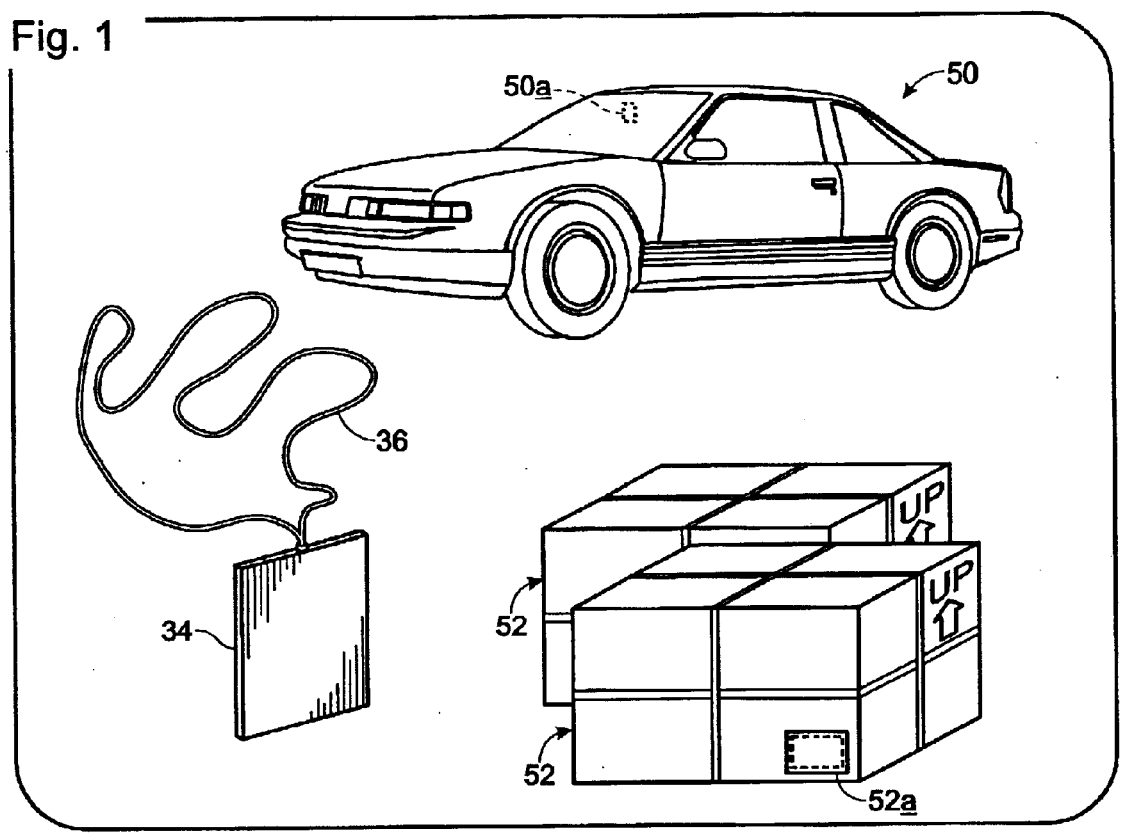
FIG. 1 depicts various embodiments of an identifier device, such as a security card, badge or token, which may be associated with persons, property, and/or other things in a physical location. The identifier device may be used in accordance with the security systems and methods described herein to provide security in a physical location, such as an office building.
Figure 2:
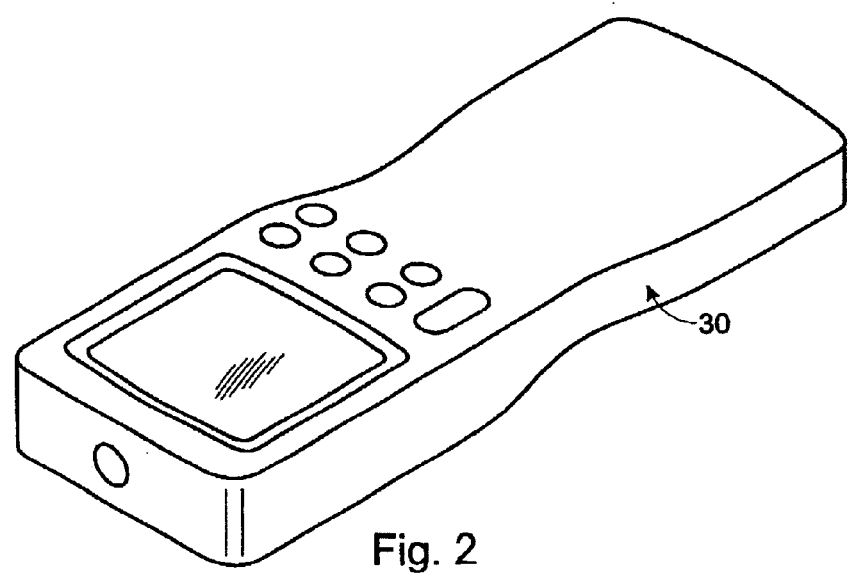
FIG. 2 depicts a portable device that may be used in connection with the security systems and methods described herein. In particular, the portable may be configured to read data from identifier devices, such as those depicted in FIG. 1.
Figure 3:
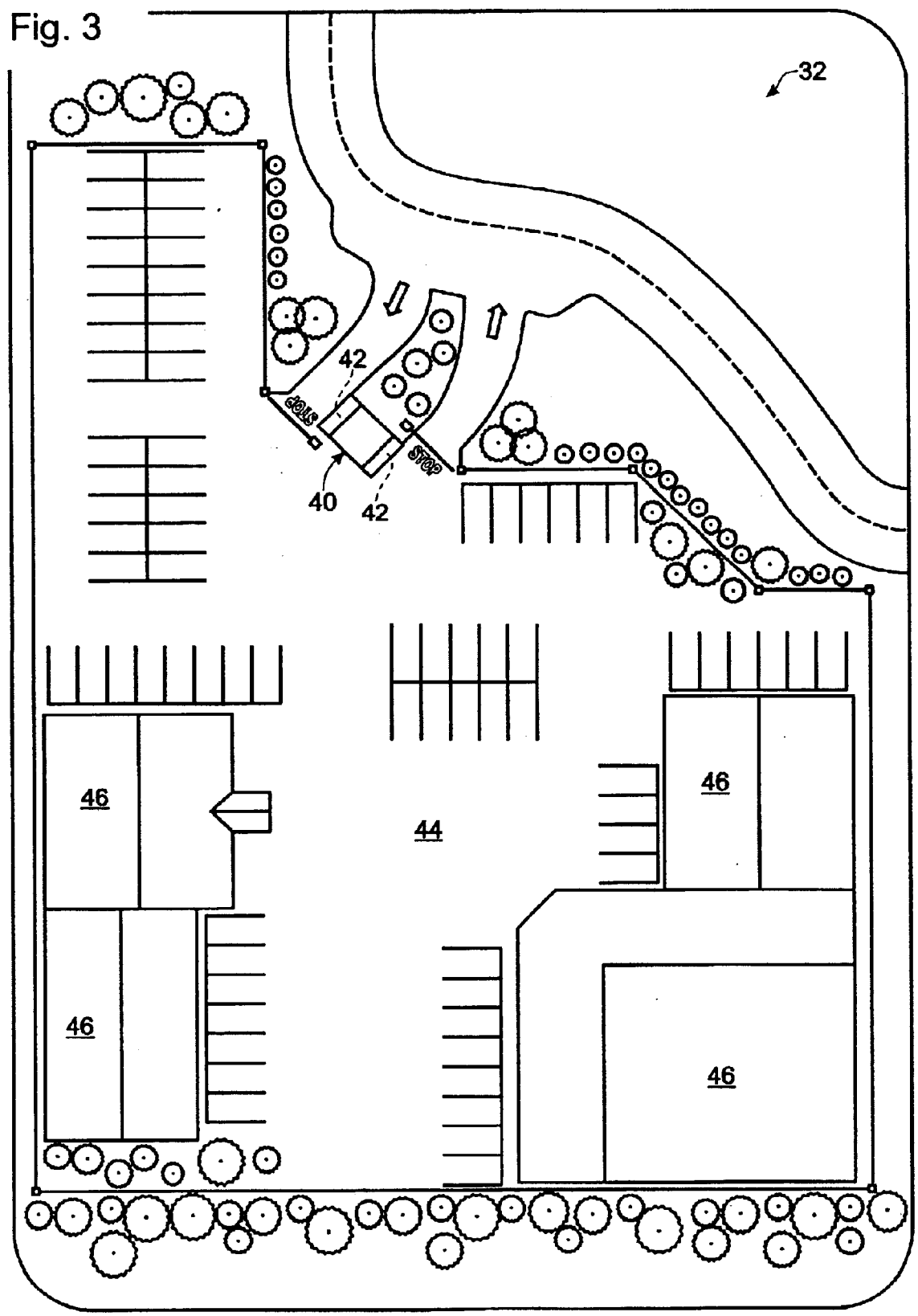
FIG. 3 depicts an aerial view of an exemplary physical location to which the present security systems and methods may be applied.

Referring initially to FIGS. 1-3, various devices are depicted along with a physical location in which those devices may be used to enhance security at the physical location. Specifically, FIG. 1 depicts various embodiments of an identifier device that may be associated with persons, property, and/or other things and places found within a physical location. FIG. 2 shows a handheld device 30 that may be used to read information from the identifier. The identifier devices and handheld device may be used to enhance security at a physical location, such as office complex 32 (FIG. 3).

The identifier device may be embodied as a tag, badge or card 34 (FIG. 1), which may be assigned to a user and carried via lanyard 36 or other appropriate mechanism. Card 34 may display a photograph and/or include other data associated with the user. Typically, card 34 contains some mechanism allowing the card to be read or tracked by various security devices in use at the physical location (e.g., complex 32). For example, as discussed in more detail below, card 34 may be configured to be read by a radio frequency (RF) proximity reader to control and monitor the user's access to particular areas within a physical location.

Such a system could be employed, for example, to control and monitor access to various portions of office complex 32. Indeed, office complex 32 typically will include a main gate 40 equipped with card readers 42 to control and monitor personnel and vehicle traffic entering and leaving the grounds. Access to parking areas 44 and buildings 46, and to particular locations within the buildings, may also be controlled via card readers or like devices. The reading devices and cards may also be configured for longer-range communication to allow dynamic tracking of movement through the physical location, instead of just taking readings from the identifier device at gates and other fixed locations.

It should be appreciated that badges, cards and other identifier devices may be widely implemented within an office complex or other physical location. For example, as shown in FIG. 1, identifier devices may be incorporated into various tangible things, such as a vehicle 50 and containers 52 (incorporating identifier devices 50a and 52a, respectively). This enables the security system to obtain information about those things, including location and/or movements of the objects.

The security systems and methods described herein may be implemented as a centralized system configured to administer security for plural physical locations associated with a number of different entities. These entities will be referred to herein as "sponsors," for reasons which will become apparent in the following discussion. A sponsor can be any type of entity that has an associated physical location (e.g., such as office complex 32), and may include businesses, non-profit organizations, academic institutions, governmental agencies, military organizations, etc.

The security systems and methods described herein may be applied to sponsor personnel (e.g., employees) and things permanently located within a sponsor's physical location. However, the systems and methods provide particular advantages when applied to personnel and other entities that are not formally associated with the sponsor. These entities will be generally referred to using the term "vendor." Because vendor personnel are not employees of the sponsor, the vendor entities may also be referred to as "outside entities" and their personnel may be referred to as "outside personnel."

For example, assume that a hypothetical company called the ABC Corporation has a manufacturing facility where it makes computer chips. In this example, the ABC Corporation is a sponsor, and its employees are sponsor personnel. In addition to ABC's employees, it's likely that many others would have access to ABC's physical location (i.e. the manufacturing facility). Service companies or other outside entities (i.e., vendor entities) might be contracted with to provide maintenance, construction, security, food service, temporary staffing, laundry and other services. Personnel from these different vendor entities would have access to the ABC's physical location in order for these services to be performed. The ABC Corporation would likely have concerns about the vendor entities, as well as about the particular vendor personnel that would have access to its facility.

Assuming a large number of potential vendor entities with changing personnel rosters, administering physical security becomes vastly more complicated than simply addressing security issues pertaining to ABC's own personnel.

Figure 4:
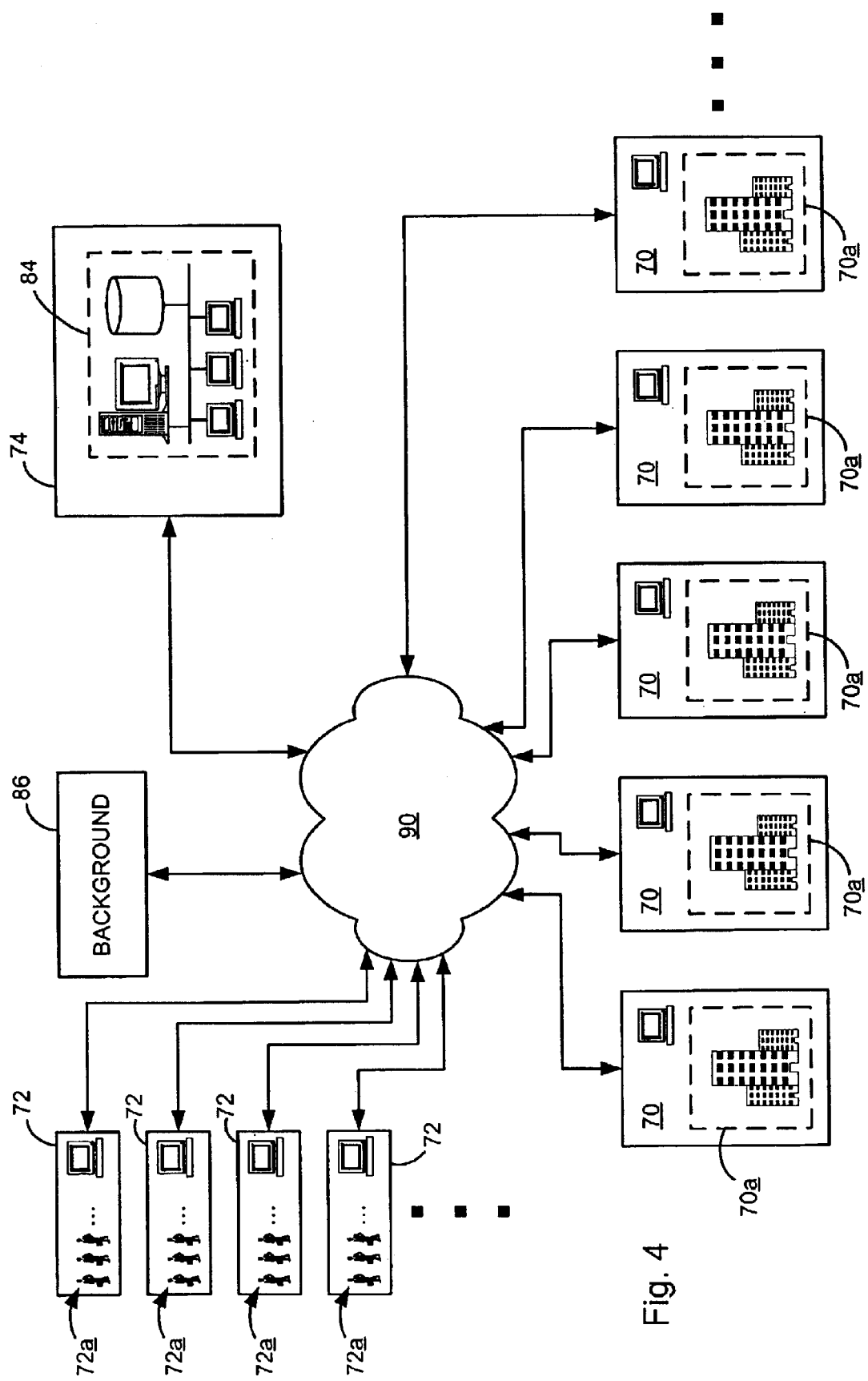
FIG. 4 depicts various entities that may be involved in implementing the present security systems and methods, including entities desiring to secure their physical locations (sponsor entities), entities with personnel having access to the physical locations (vendor entities), and a central entity that may facilitate providing security at the physical locations (an admin entity).

Referring again to the figures, FIG. 4 schematically depicts various sponsor entities 70 and vendor entities 72, along with a centralized entity, such as admin entity 74, that may be used to aid in implementing security at the physical location(s) 70a associated with each sponsor. Admin entity 74 typically is a separate entity that is assigned to initialize and administer security systems that specifically address security issues pertaining to vendors 72 and vendor personnel 72a. As indicated, the different depicted entities typically all employ computer systems that may be employed in connection with the security systems and methods described herein. In particular, admin system 84 may be configured to play an important role in setting up and administering the security systems and methods described herein.

As explained below, the various functions that may be performed by admin entity 74 may alternatively be performed by the individual sponsor entities 70. In many cases, however, it will be more cost-effective for individual sponsors if a centralized entity is employed, such as admin entity 74. Even where a centralized admin entity is employed, the individual sponsors typically will have on-site hardware and software, though the existence of a centralized entity normally will reduce the amount of on-site hardware and software needed.

The present disclosure provides for convenient systems and methods, most or all of which may be automated, by which a sponsor can obtain enhanced security relative to outside entities (e.g., vendors) and individuals associated with those entities. After vendors are notified of the program, the vendors may access a computerized system (e.g., admin system 84) to enter preliminary data pertaining to the vendor entity. In typical implementations, the computerized system is operated by admin entity 74, as indicated, though the system may be operated or controlled by the sponsor.

After entry of the preliminary initialization data, full registration information may be provided for the vendor and an entity-level inquiry may be undertaken to address various concerns of the sponsor. For example, a check may be performed to determine whether the vendor entity has a valid business license or if the vendor is properly insured. Credit information and other financial data may be reviewed. If the vendor is subject to special licensing or certification requirements, records may be reviewed to ensure these requirements are satisfied. These background inquiries may be performed in-house by admin entity 74 or by the sponsors, though it will often be desirable to outsource the inquiry to a separate entity, such as background check entity 86.

Typically, once the entity-level background check for the vendor clears, the vendor personnel that are to access the sponsor's physical location must enroll in the system. The vendor personnel are notified of the program, typically via email or some other automated process, and are requested to log on to the system and provide certain enrollment information. Typically, an individual background check is performed on the vendor employee after complete enrollment information is obtained.

After the vendor entity and its employees are entered into the system and background checks have cleared, the system typically produces, for each approved vendor employee, a security card, badge or tag, such as that shown in FIG. 1.

This may involve taking photographs of the vendor employees, and/or capturing fingerprints, retinal scans, voiceprints, or other biometric data. Thereafter, the vendor employees may access the physical locations of the sponsor for which they are authorized. The cards and personnel data may be used to control and monitor access to sponsor facilities. Using online systems such as admin system 84, the sponsor, admin and/or vendor entities may monitor personnel access to a location, obtain various reports, and perform maintenance tasks such as adding new users, deactivating cards, monitoring the results of recurring background checks, etc.

It should be appreciated that the computer systems of the various entities shown in FIG. 4 and described herein may be connected via any type of communications link or network. In the depicted example, the different entities are connected via a network 90 such as the Internet. Indeed, much of the interaction between the described entities may be advantageously implemented with software programs communicating via the World Wide Web. In many cases, it will be desirable to implement encryption, secure connections, and/or other security measures to protect sensitive data.

As discussed above, a centralized entity (e.g., admin entity 74) need not be employed to obtain many of the advantages of the described security systems and methods. In many cases, however, it will be more cost effective for the individual sponsor entities if certain functions are consolidated at a central entity. In such a case, the costs associated with the centralized security functions can be spread over a large number of sponsor entities, and duplication of certain aspects of the system can be minimized. Also, the primary responsibility for administering security can be placed in the hands of an entity that has special security expertise, allowing a given sponsor entity to focus on its primary objectives, which presumably involve matters other than personnel security.

Figure 5:
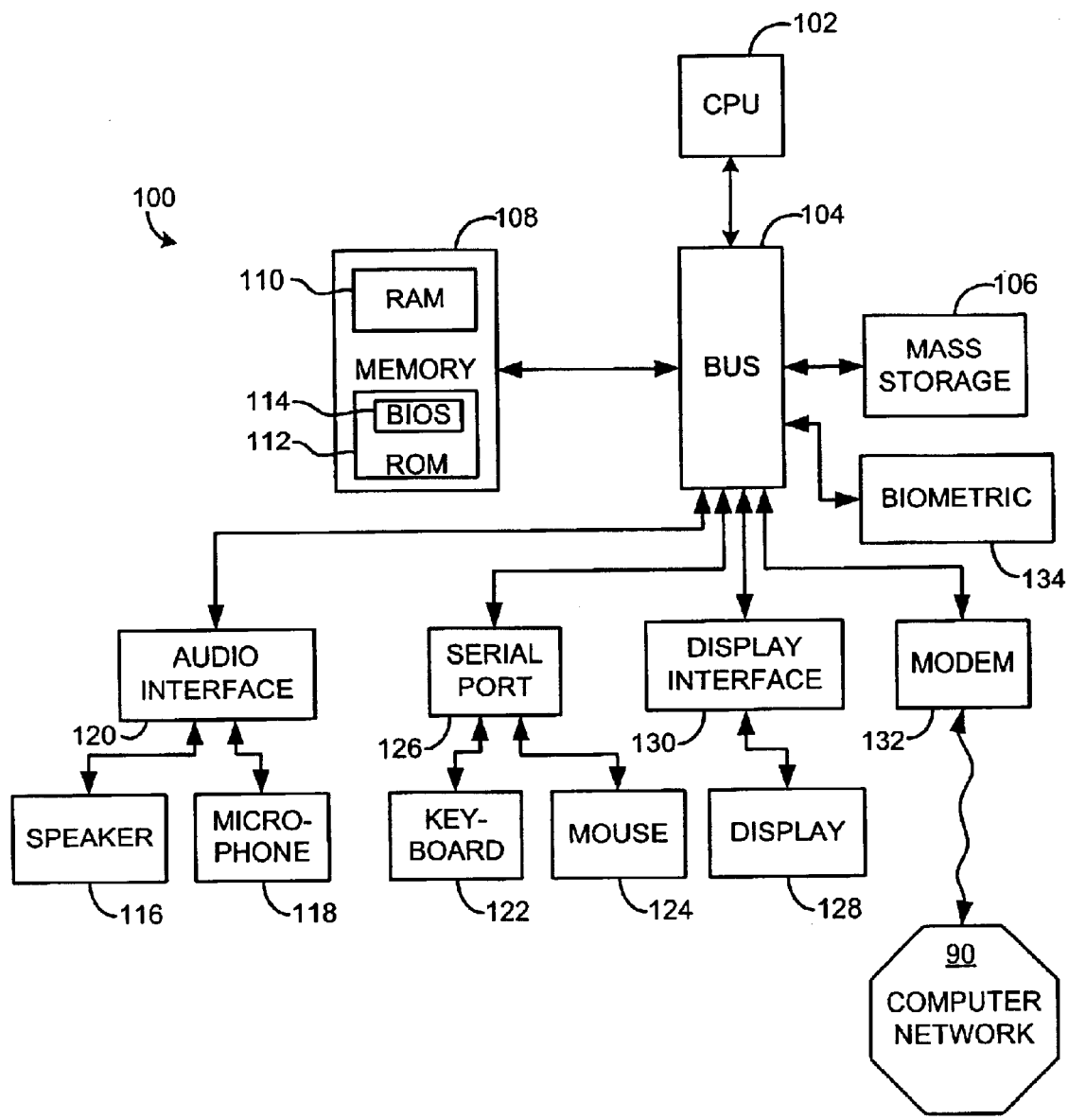
FIG. 5 depicts an exemplary computer device that may be used in connection with the security systems and methods described herein.

Much of the functionality discussed herein may be implemented on networked or standalone computer devices. FIG. 5 is a schematic depiction of an exemplary computer device that may be used in connection with the described systems and methods. As shown in FIG. 5, computing device 100 typically is a personal computer including a central processing unit (CPU) 102 coupled to a bus 104. A mass storage device 106, such as a hard drive, CD ROM drive, tape drive, etc., and a memory 108 are also linked to bus 104. Memory 108 typically includes random access memory (RAM) 110, and read only memory (ROM) 112. ROM 112 typically includes a basic input output system (BIOS) 114, which is configured to start up and operate basic functions of the computing device.

Computing device 100 also typically is linked to several input and output devices through a variety of interfaces. Bus 104 may be linked to a speaker 116 and microphone 118 through an audio interface 120. Speaker 116 and microphone 118 may be of separate construction, may be mounted to an interior or exterior of the computing device, may be in the form of a telephone handset or headset, or may be of some other construction suitable to transmit and receive sound to and from a user of the computing device.

Computing device 100 may also include a keyboard 122 and mouse 124 coupled to bus 104 by a serial port 126. Alternatively, a parallel port, USB port or other interface may be used to connect external devices such as keyboard 122 and mouse 124 to bus 104. Photographs and/or other image data may be loaded onto computing device 100 via serial port 126, a parallel or USB port, or any other suitable interface. Computing device 100 also typically includes a display 128 coupled to bus 104 by a display interface 130. Display 128 typically is a cathode ray tube monitor. Alternatively, display 128 may be virtually any other type of display suitable for visually presenting information to a user, including an LCD display. Computing device 100 typically also includes a modem 132 configured to enable communications to and from the computing device through network 90. Modem 132 typically is an ISDN or telephone line modem, but alternatively may be a cable modem, wireless modem, or other suitable form of modem configured to transmit data to and from computing device 100. For certain applications, it will also be desirable to equip computing device 100 with a biometric input device 134 configured to capture biometric data (fingerprint scan, retinal scan, etc.).

FIGS. 5–18 depict various exemplary methods for initializing the described security systems, registering entities into the described systems, enrolling personnel, producing and issuing security badges, and operating and maintaining the security systems after installation. The various steps may be performed manually or automatically, or with a combination of manual and automated procedures. In many implementations, it will be desirable to perform aspects of the methods using computer-based systems operated and maintained by the various entities participating in the security program.

Figure 6:
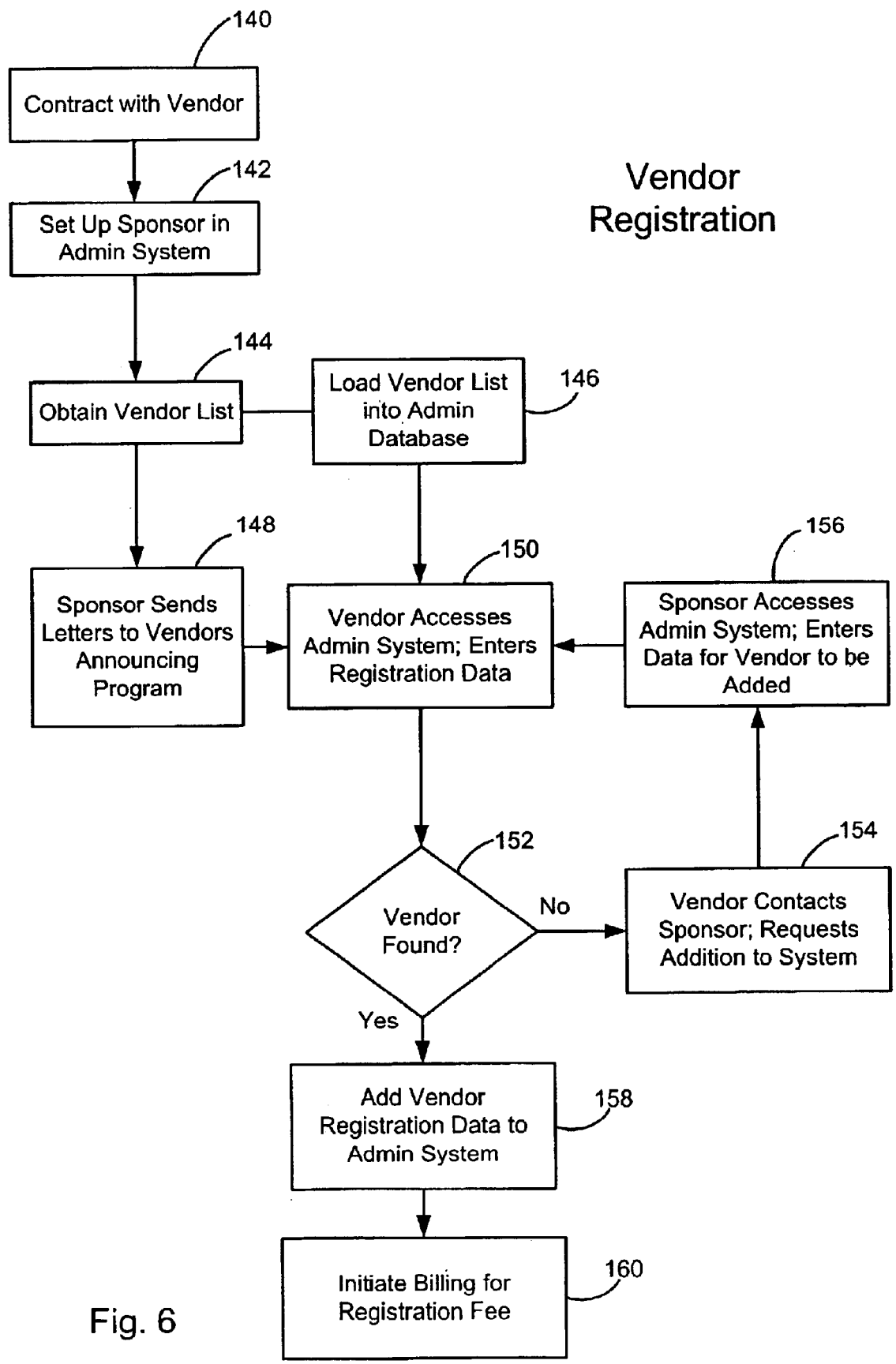
FIG. 6 depicts aspects of an exemplary method for registering vendor entities for participation in the present security systems and methods.

Referring now to FIG. 6, the figure depicts various steps that may be performed to initialize vendor entities within the described security systems. As shown at 140, the method may first include formalizing contractual relationships between vendor entities and sponsor entities (e.g., a manufacturing contracting with another company to provide on-site maintenance). Such contracts may, for example, specify the services to be performed by a particular vendor at a sponsor's physical facility. Typically, admin entity 74 is not involved in establishing contracts between sponsors and vendors, though the contracts will often address security issues involving the admin entity. Once a particular sponsor entity determines a need to apply security procedures to outside entities, the sponsor entity may contact the admin entity to commence participation in the security systems administered and facilitated by the admin entity. Typically, after this initial contact, the sponsor is initialized in admin system 84, as shown at 142. As discussed in more detail below, admin entity 74 typically will manage security for multiple sponsor entities, each of which may do business with different vendor entities.

The method may further include, as shown at 144, obtaining a list of vendors associated with each individual participating sponsor entity. At some point after this list is generated, certain preliminary information for each vendor may be entered into a database maintained by admin entity 74 (e.g., a database implemented within admin system 84), as shown at 146. In many cases, it will be desirable that the individual sponsors notify their current and/or prospective vendors of the security program, via letter, email or other suitable manual or automatic notification, as shown at 148. The notification typically will also include a request that the vendor access the database maintained by admin entity 74 in order to enter preliminary registration data for the vendor. As shown at 150, the vendor may access the online system via a web browser connected to the World Wide Web. This may be performed from any location, but often this step will be performed from the vendor's location using a computing device, such as that shown in FIG. 5, that is connected via a secure connection (e.g., a secure socket layer connection over the World Wide Web). The browser application may connect with admin system 84 via network 90.

Alternatively or additionally, as shown at 146, sponsor personnel may facilitate entry of preliminary data by loading the sponsor's vendor list into admin system 84. Typically, each sponsor participating in the system will be assigned a unique sponsor code, and vendors will use the code of their particular sponsor(s) when accessing admin system 84. After a vendor accesses the admin system (e.g., as shown at 150), the method may include determining whether that vendor has been initialized within the admin system, as shown at 152. If the vendor is not found, the vendor may contact the sponsor and request to be added into the system, as shown at 154. As shown at 156, the particular sponsor may then initialize the system with that vendor's preliminary information, allowing the vendor to access the system (e.g., at 150) and continue the vendor approval process by entering complete registration data for the vendor (e.g., address, contact information, description of business, description of services to be performed for sponsor, etc.), as shown at 158. Further, in many cases it will be desirable to charge various fees to defray costs to sponsors of the described security systems and methods. Accordingly, the method may include obtaining payment from participating vendors, as shown at 160.

Figure 7:
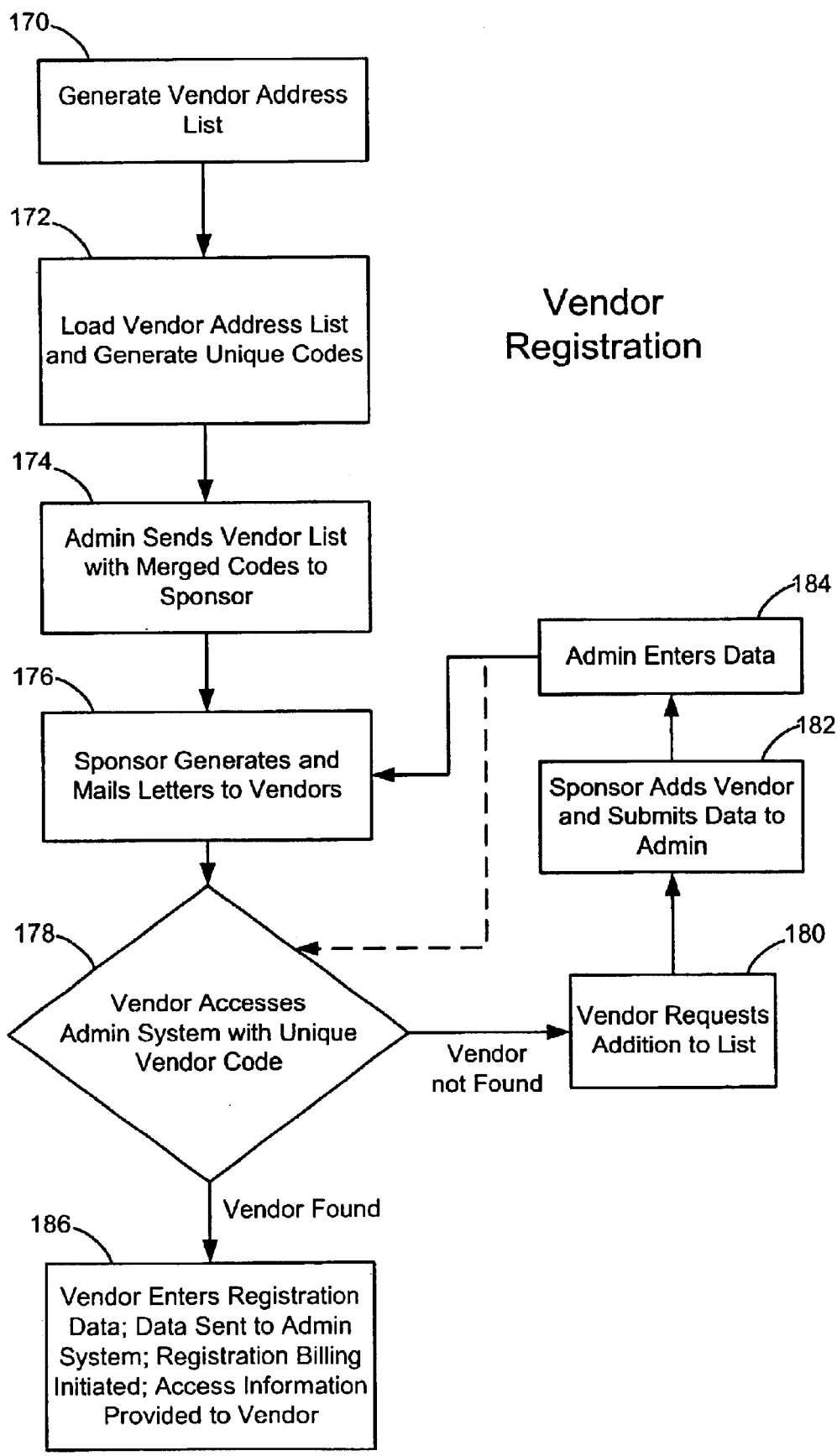
FIGS. 7, 8 and 8A depict further aspects of an exemplary method for registering vendor entities for participation in the present security systems and methods.

FIG. 7 depicts further aspects of an exemplary method for initializing vendors and obtaining entry of vendor registration data. As shown at 170, the method may include generating an address list for existing or prospective vendors. Typically, the addresses are generated by the sponsor. The method may further include loading the generated address list into the system (e.g., admin system 84) and generating unique codes for linking records within admin system 84, as shown at 172. Typically, this is performed by admin entity 74. The method may then include the admin entity sending the vendor list with merged vendor codes to the sponsor, to enable the sponsor to provide notification to its vendors, as shown at 174 and 176. After receiving notification, vendor entities access the admin system with the vendor code provided in the notification from the sponsor, as shown at 178. If the system does not contain preliminary identification data associated with the vendor, the vendor may ask to be added to the system, and the sponsor and admin entity may then initialize the particular vendor, as shown at 180, 182 and 184. If the vendor is in the system, registration and approval may proceed, as shown at 186. Specifically, the vendor may enter the required registration data, and the admin system database may be updated with the vendor registration data. In addition, billing procedures may be initiated and further system access information may be provided to the vendor.

Figure 8:
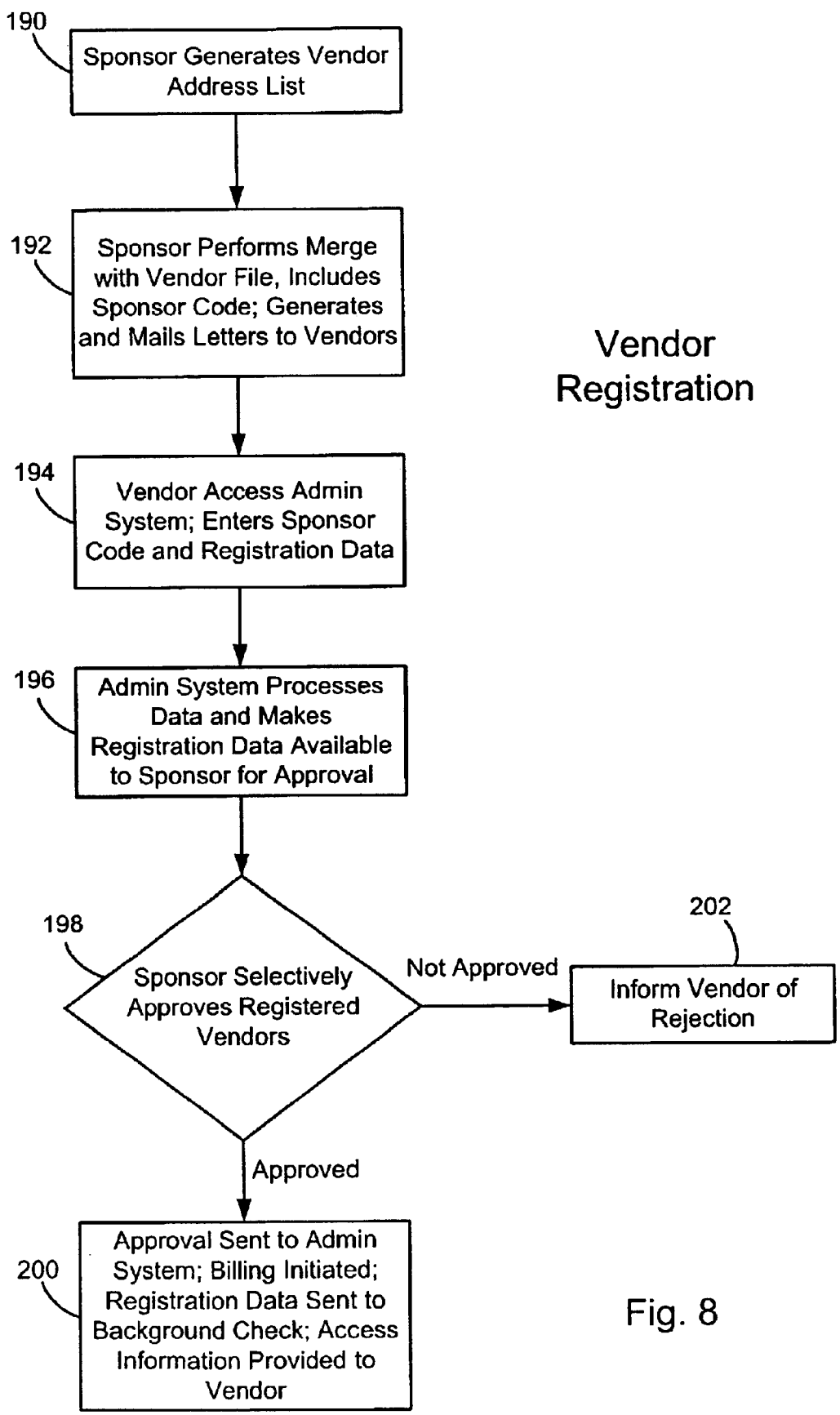

FIG. 8 depicts another alternate method implementation for initializing vendors and obtaining entry of vendor registration data. As shown at 190 and 192, the method may include generating a vendor address list, merging the addresses with an already-generated vendor file, and providing notification to vendors. The vendors may then access the admin system (e.g., admin system 84) to enter registration data, as shown at 194. The method may also include steps similar to those previously described, which allow un-initialized vendors to be added to the vendor list for a particular sponsor. Once registration data has been entered for the vendors, the registration data may be presented to the sponsor for selective approval and appropriate subsequent action, as shown at 196, 198, 200 and 202. Specifically, for approved vendors, the approval may be sent to the admin system, billing may be initiated, and further access information may be provided to the approved vendor, as shown at 200. A background check of the approved vendor may also be initiated, as will be explained in more detail. Vendors that are rejected by the sponsor may be provided with notification, as shown at 202.

Figure 8A:
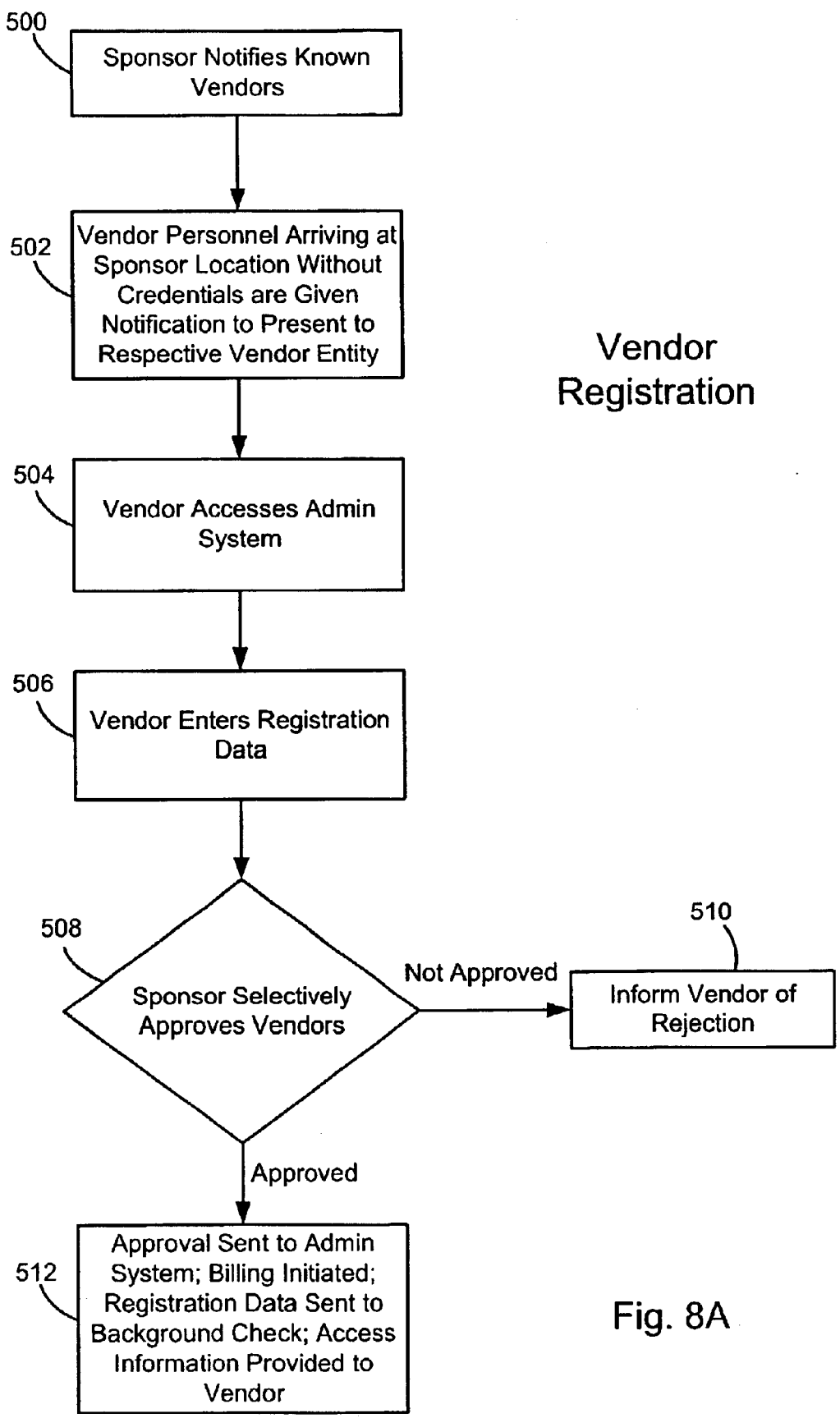

FIG. 8A depicts yet another alternative for notifying and registering vendor entities. At 500, the method includes contacting known vendors to notify them of the security program. Typically, this notice is sent by the sponsor entity and will include a unique sponsor code and information about how to register with the security system (e.g., specific instructions on how to log on to and use admin system 84 for the registration process). As shown at 502, the method may include notifying vendor entities upon access attempts by non-cleared outside personnel. Specifically, when an individual attempts to access a sponsor location without credentials, the individual is given information about the security program, and is asked to pass the information along to their employer (a vendor entity). Alternatively, the sponsor entity may independently contact the corresponding vendor entity upon an access attempt by an unauthorized individual (e.g., as at 500).

After the vendor entity has been notified, the vendor entity may access admin system 84 and enter registration data, as shown at 504 and 506. At 508, the sponsor entity may selectively grant or deny approval to the various vendor entities that have attempted to register for physical access to the facilities of a given sponsor entity. Approval may be granted or withheld for a variety of reasons. For example, if a vendor entity does not have a current service contract with the sponsor entity, the sponsor entity may wish to withhold approval for the vendor entity. Typically, the vendor entity is informed in the case of a rejection, as shown at 510. As shown at 512, approvals are recorded within admin system 84 and billing and background checks may then be initiated for the approved vendor entity.

Figure 9:
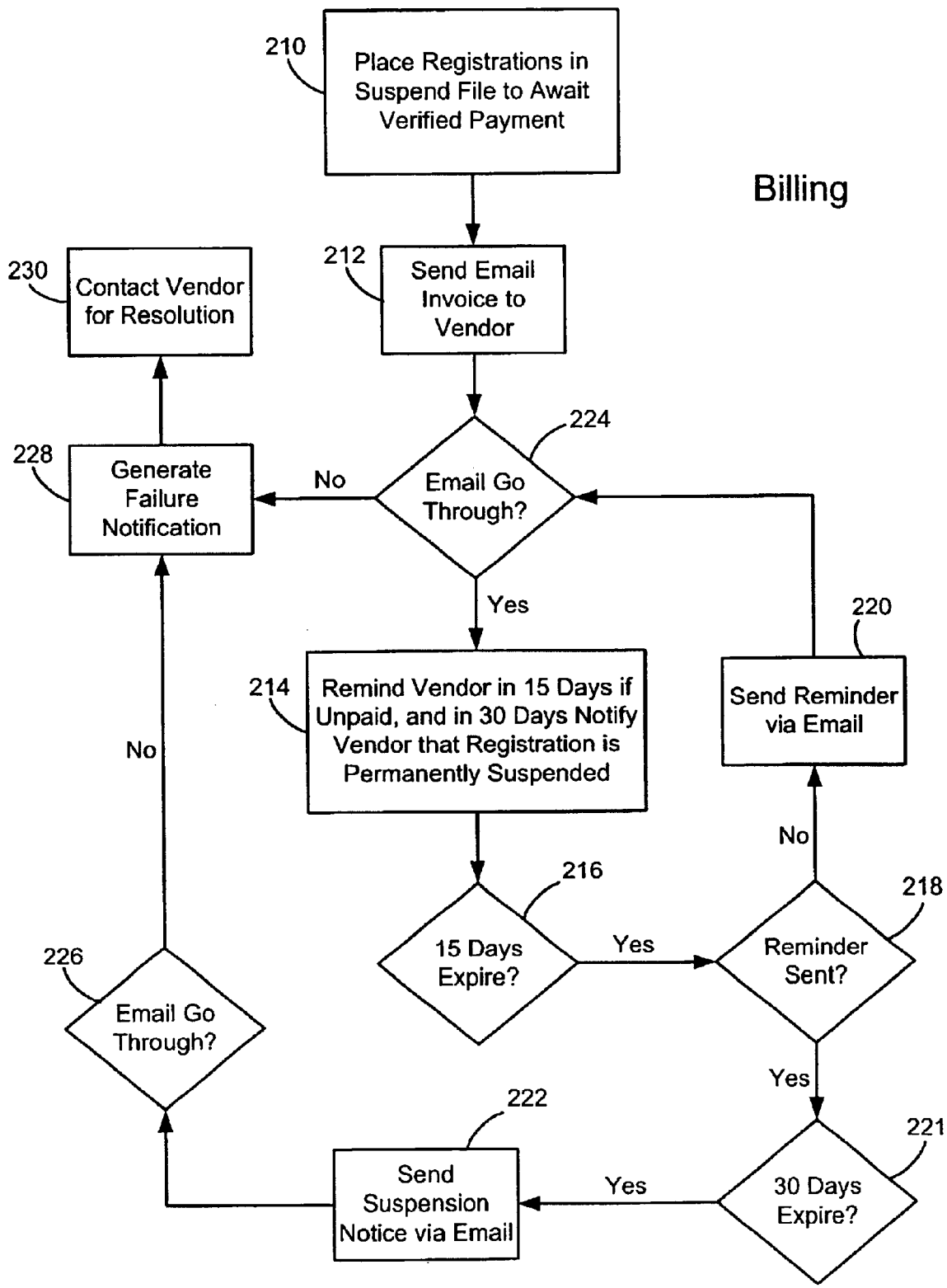
FIGS. 9 and 10 depict aspects of an exemplary billing method that may be used in connection with registering vendor entities and their personnel.

As previously discussed, it will often be desirable for the sponsor entities and/or admin entity to defray costs by obtaining payment from the vendor at various stages during the processing of initializing, registering and approving vendors and vendor personnel. FIG. 9 depicts an example of a billing method that may be advantageously employed to extract payment from vendors and other entities. The method is discussed in the context of the vendor registration procedures that occur before performing a background check of the vendor entity. It should be appreciated, however, that the exemplary method may be appropriately modified for use at other times.

As shown at 210, the method may first include placing registrations in a "suspend file" until verification of payment has been received. An email invoice or other suitable notification may be sent to the vendor, as shown at 212. After successful transmission of the notification, the vendor may be reminded after a certain period of time (e.g., 15 days) if payment has not yet been received, as shown at 214, 216, 218 and 220. The reminder may also include warning that the vendor registration will be permanently suspended if payment is not received with a set period (e.g., 30 days). If payment is not received after the specified interval, the registration process for the vendor may be permanently suspended, as shown at 221 and 222. As shown at 224, 226, 228 and 230, the method may also include contacting the vendor in the event that a problem is encountered in delivering the various notices to the vendor. Typically, once payment is received, processing continues by performing a background check of the inventor, as described below.

Figure 10:
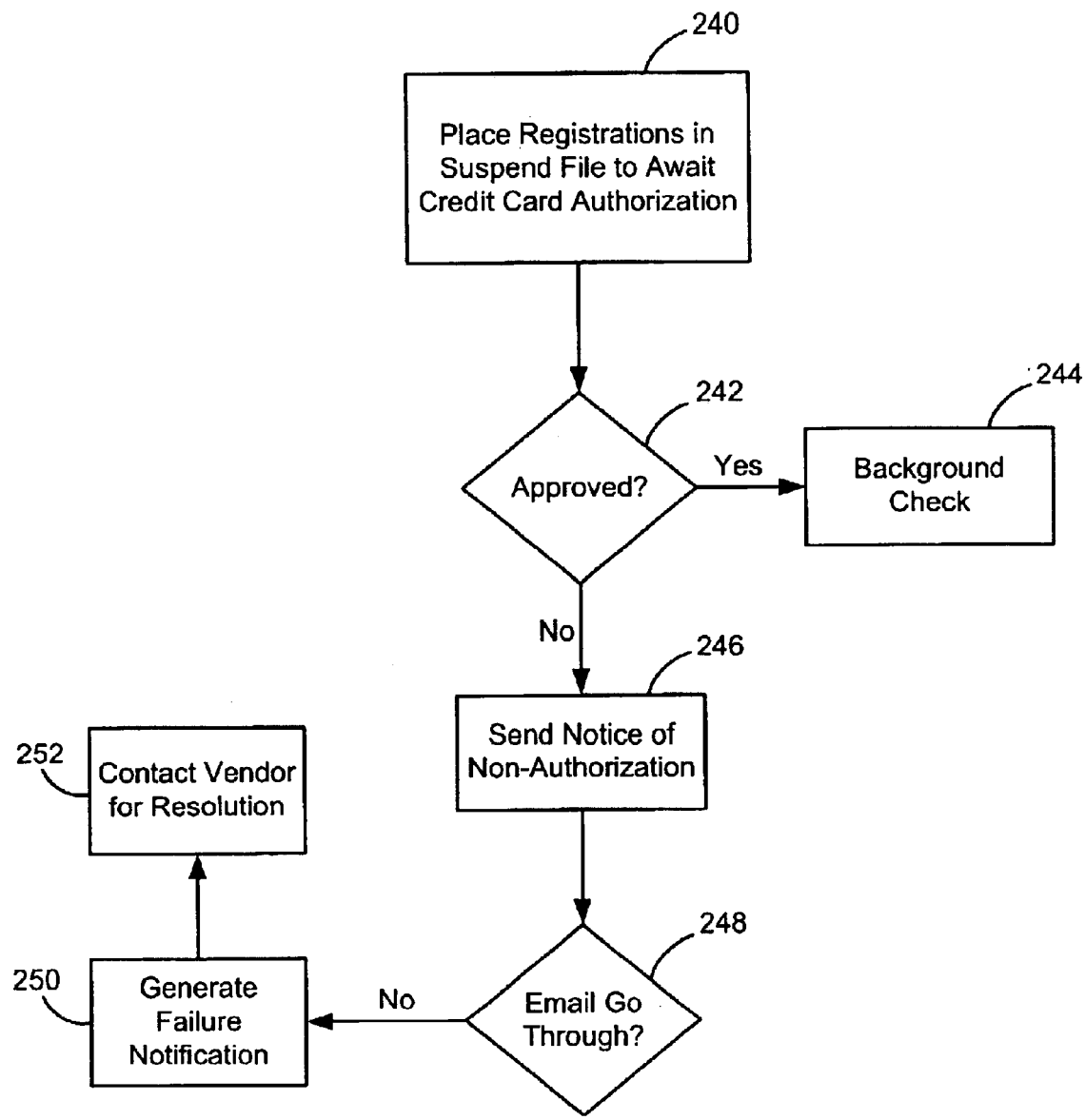

FIG. 10 depicts another example of a billing method that may be advantageously employed to extract payment from vendors and other entities. The example is specifically applicable to credit card payments. As with the previous example, the method may include placing registrations in a suspend file pending receipt of payment, as shown at 240. If credit card payment is approved, the background check of the vendor may then be initiated, as shown at 242 and 244. In the event that credit card payment is not authorized, an appropriate notice is sent to the vendor, as shown at 246, 248, 250 and 252.

The billing methods described herein may be performed wholly by admin entity 74, or may be outsourced in whole or in part to third parties. For example, outside entities such as application service providers may be used to facilitate payment processing, sales tax processing, and/or other billing functions.

As indicated above, after obtaining vendor registration data, it will often be desirable to perform a background check on vendor entities. In many cases, it will be desirable to outsource this check to a third party (e.g., background check entity 86) that specializes in obtaining the information of interest. The check may include obtaining information about or verification of: (1) general business licenses, and/or special licenses or certifications for particular industries; (2) insurance policies and claim history, including general liability, worker's compensation, automotive, etc.; (3) credit statistics and other financial information; (4) property owned by the vendor entity. In addition to or instead of the listed information, any other suitable issue may be investigated as part of the background check.

Figure 11:
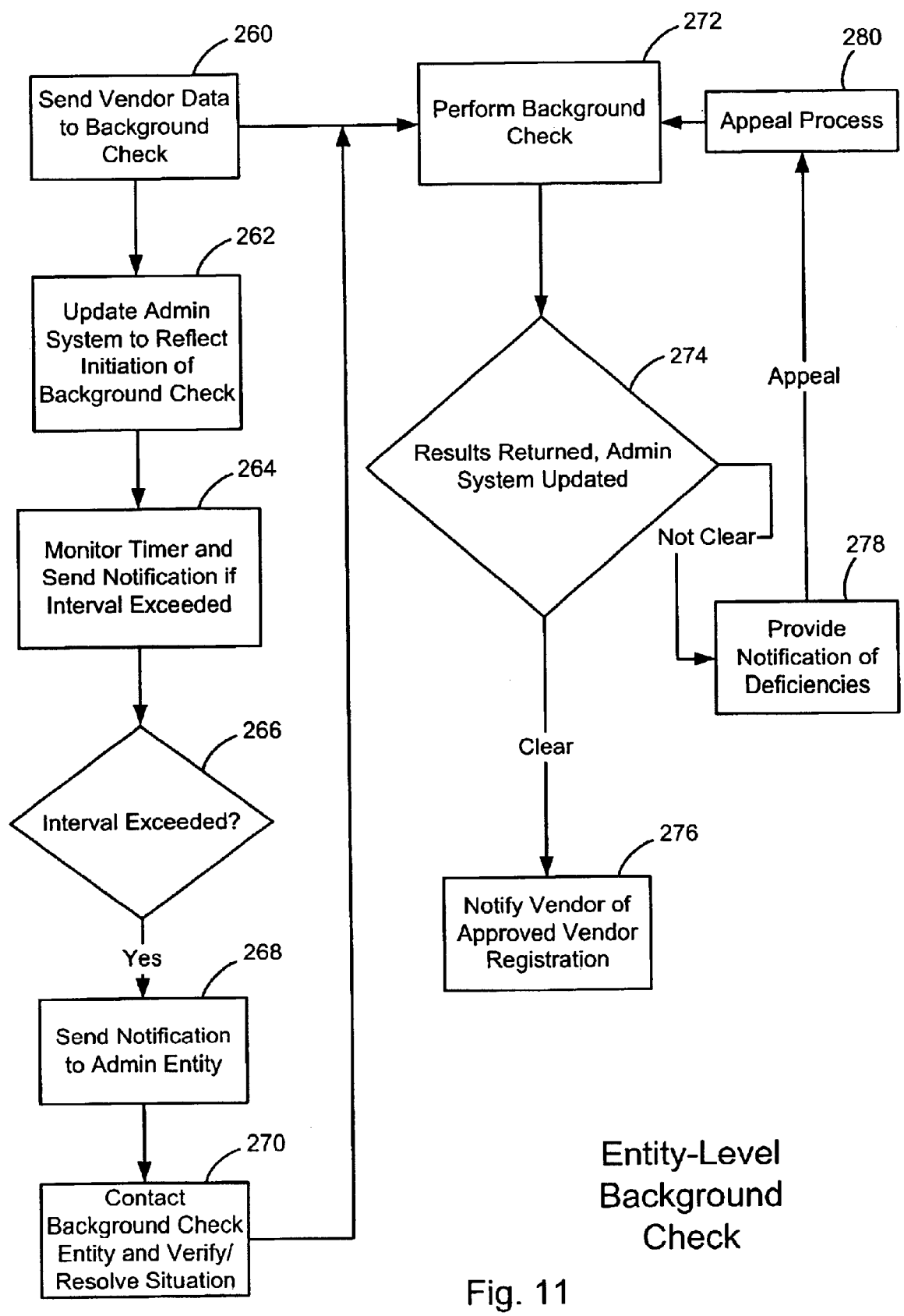
FIG. 11 depicts an exemplary method for performing background checks on vendor entities.

Referring particularly to FIG. 11, an exemplary implementation of the background check is depicted. First, some or all of the vendor registration data is sent to the background check entity, as shown at 260. Typically, admin system 84 is then updated to reflect initiation of the background check, and a timer process may be provided to notify the admin entity in the event of a slow background check, as shown at 262, 264, 266, 268 and 270. Typically, a three-day interval is used, though any other period of time may be used for follow-up.

At 272, the method includes performing the actual background check, which may include verifying certain data provide by the vendor, and or performing the various inquiries referenced above (insurance check, licensing check, etc.). The method may further include updating admin system 84 with the results of the check, as shown at 274, and taking appropriate subsequent action. Specifically, vendors may be notified of the results of the background check (e.g., at 276 and 278), and given an opportunity to respond in the event that the background check comes back negative (e.g., at 278 and 280).

Figure 12:
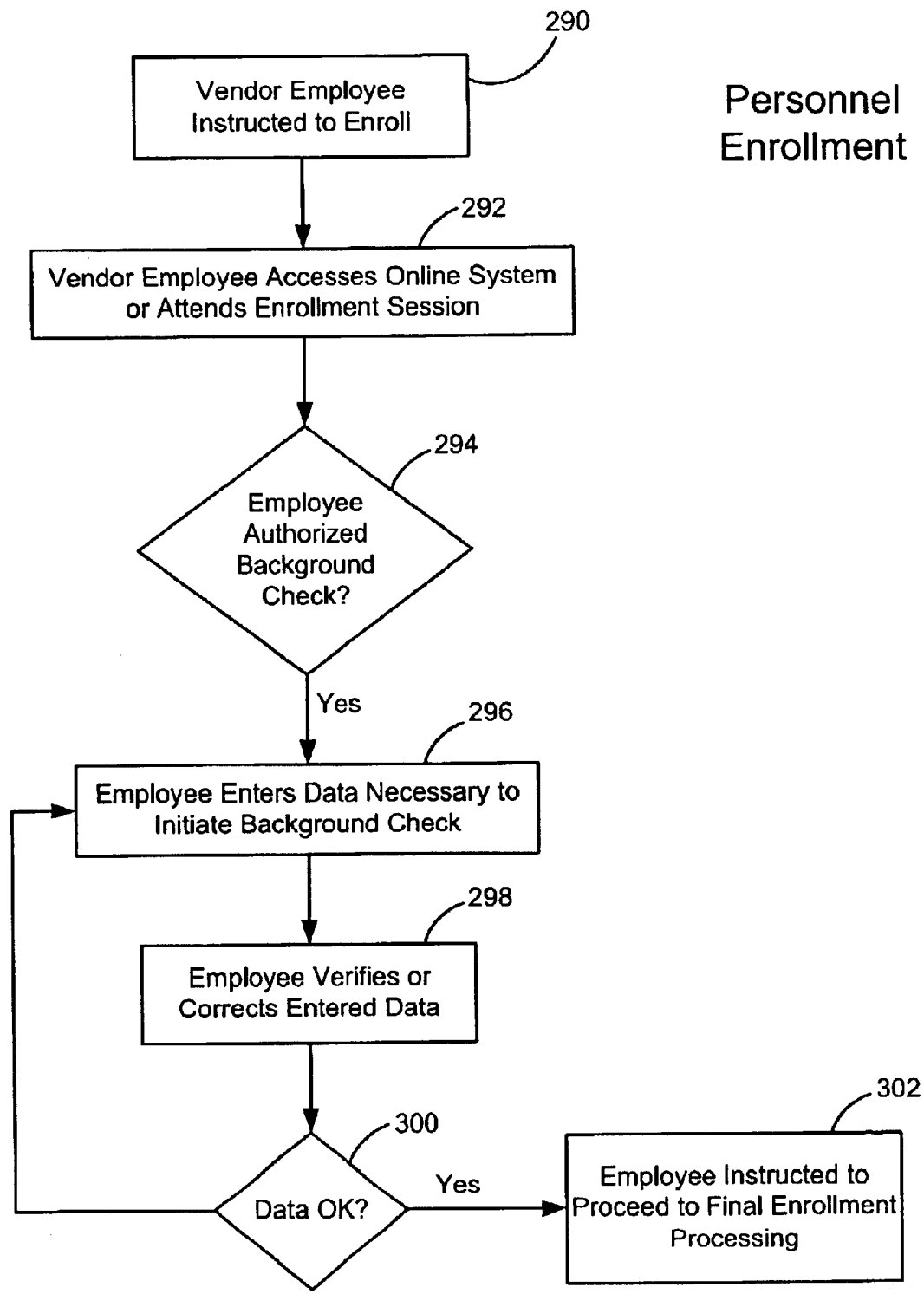
FIGS. 12 and 13 depict exemplary methods for enrolling vendor personnel for participation in the present security systems and methods.

In most cases, sponsors will be interested not only in registration and approval of the vendor entity itself, but also will want the vendor personnel to go through an enrollment and background check before gaining access to the sponsor's physical location. Accordingly, an exemplary method implementation for enrolling vendor personnel is shown in FIG. 12. At 290, the method may include instructing vendor personnel to attend an enrollment session or access admin system 84 to initiate enrollment and the background check process. The employee may then commence enrollment (e.g., at 292). At some point, the employee may be asked to provide authorization for a background check to be performed, as shown in the example at 294. After authorization is obtained, further data pertaining to the vendor employee is obtained, and an opportunity is provided to verify/correct the entered data, as shown at 296, 298 and 300. The employee may then be instructed to proceed to final processing prior to the background check, as shown at 302.

Figure 13:
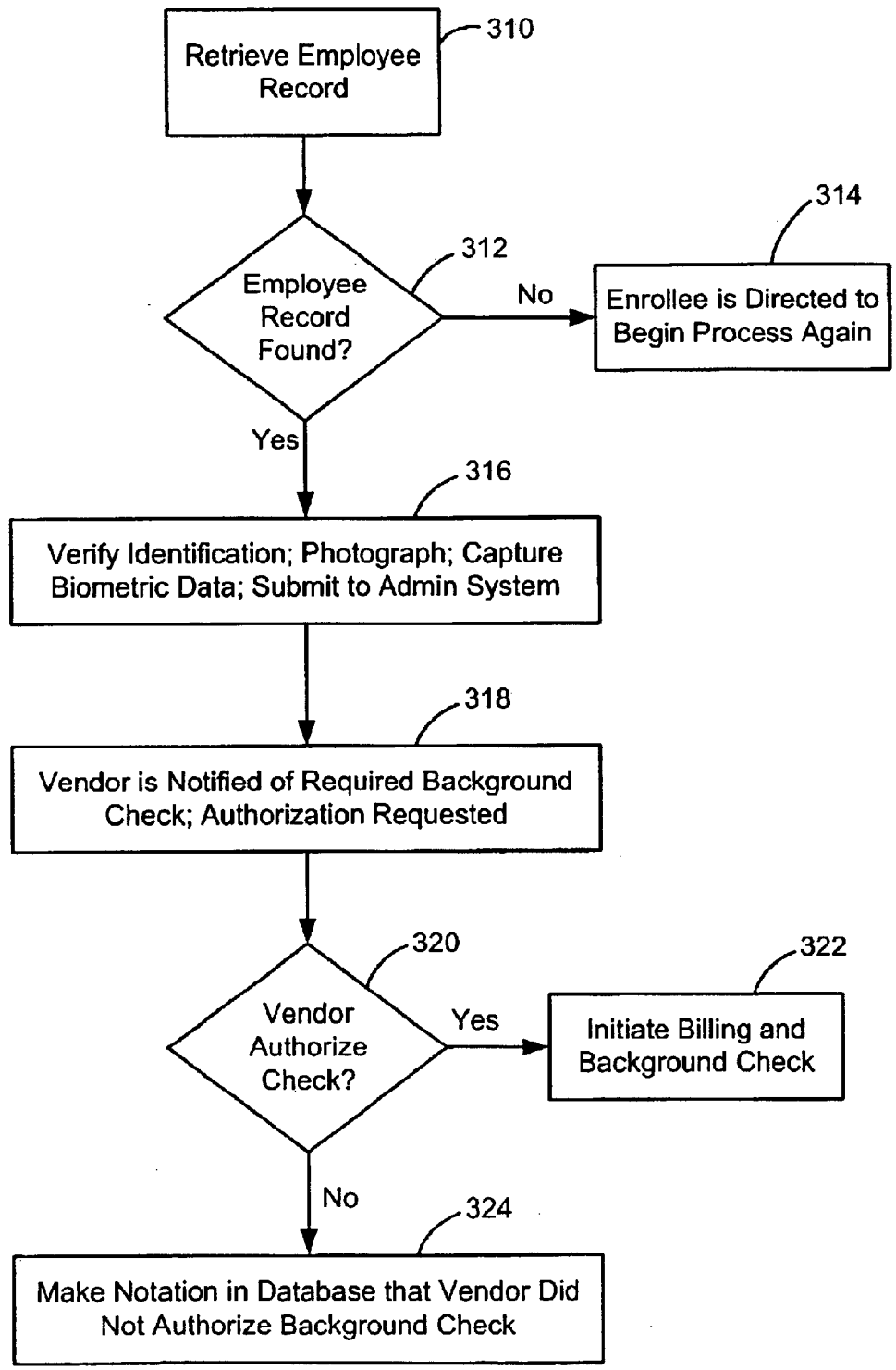

Final processing typically will involve retrieving enrollment data for the vendor employee, and photographing the employee and capturing biometric data. Referring specifically to FIG. 13, the vendor employee enrollment data may be retrieved, as shown at 310. If enrollment information pertaining to the employee is not found, the employee may be directed to go through an initial enrollment process (e.g., as shown at 312 and 314), such as that previously described with respect to FIG. 12.

Continuing with FIG. 13, once employee enrollment data is retrieved, initial enrollment data may be verified, and the employee's photograph may be taken and any desired biometric data captured, as shown at 316. These steps may be performed at the sponsor's physical location, at the vendor's location or at the admin entity's location, as desired. The vendor may then be notified that a background check for the employee is required, as shown at 318. Vendor authorization to proceed may then be checked (e.g., at 320) and appropriate subsequent action taken. If the vendor gives authorization to proceed, additional billings and the background check may initiated (322). In addition, appropriate notation may be entered into admin system 84 in the event that the vendor does not give authorization (e.g., at 324).

Figure 14:
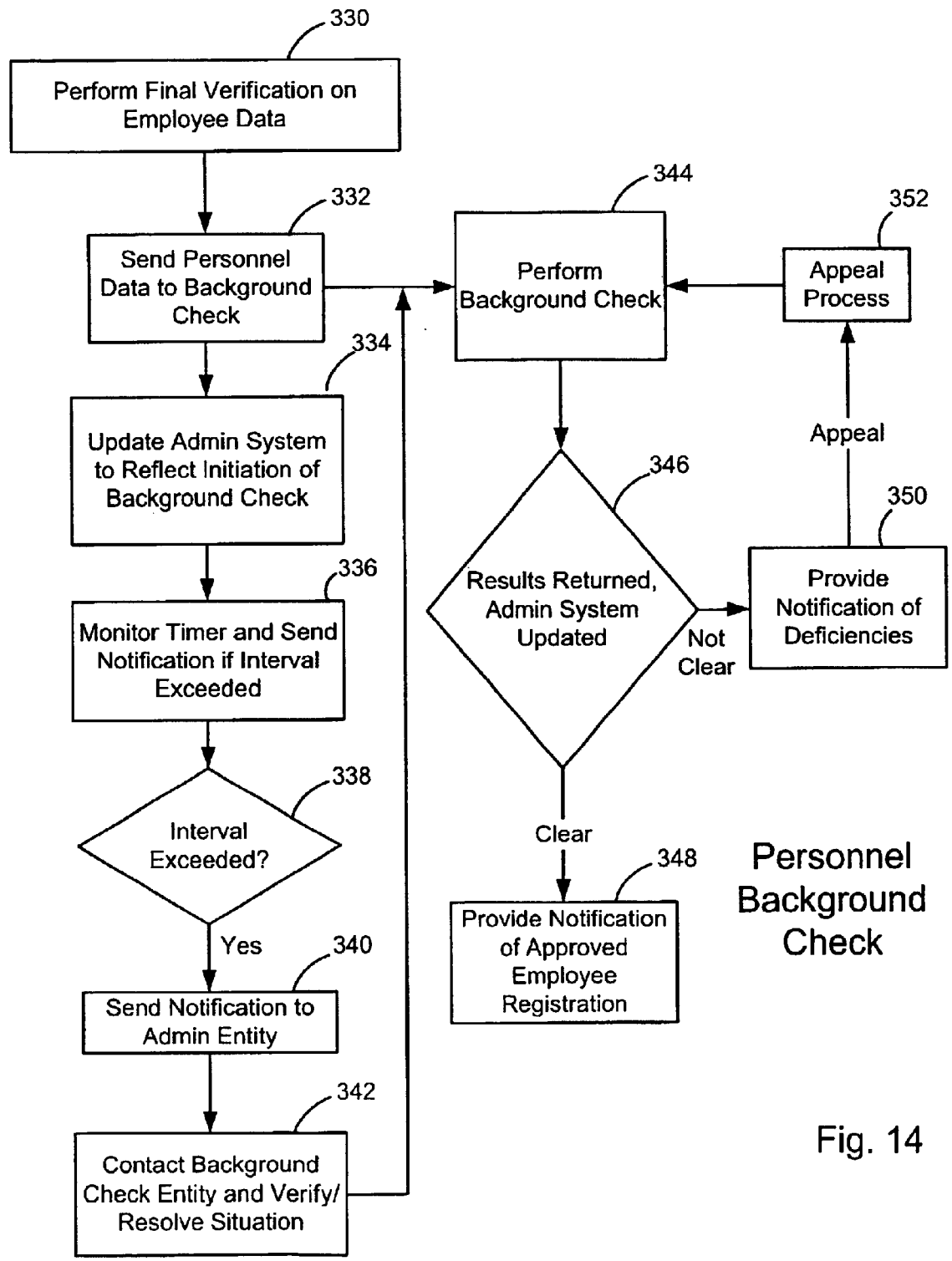
FIG. 14 depicts an exemplary method for performing background checks on vendor personnel.

FIG. 14 depicts steps associated with performing background checks on vendor employees. At 330, the method may include performing a final verification of the enrollment data entered for the employee. This may be performed by the sponsor and/or admin entity 74, with potential assistance or input from the vendor. The background check is then initiated at 332. As previously indicated, the background check may be performed in-house and/or with the assistance of an outside entity such as background check entity 86.

As with the previously described entity-level background check (described with reference to FIG. 11), the vendor personnel background check may involve any issues of concern to a particular sponsor entity. Often it will be desirable that the background check include a check for criminal offenses, including: (1) economic or property-related offenses, such as breaking and entering, theft, embezzlement, vandalism, forgery, fraud, etc.; (2) violent offenses or acts directed at persons, such as assault, battery, child abuse, domestic violence, harassment, kidnapping, stalking, rape, murder, sexual assault, reckless or drunk driving, weapons-related offenses, etc.; (3) drug offenses; and (4) any other criminal conduct, whether or not such conduct resulted in a conviction. Other issues addressed in the background check may include a check of credit reports, driving records, employment history, etc.

Additional personnel-level inquiries may be made, either prior to the actual background check (e.g., while obtaining initial enrollment data for the individual) or during the background check itself. For example, the individual's social security number may be verified to authenticate identity, and to confirm that the social security number provided is not assigned to a deceased individual. Phone numbers, addresses, birthdates, full legal names and other personal data may be reviewed for consistency and matching with public records. Telephone numbers provided by the individual may be tested or otherwise research to ensure that the numbers are not pager numbers or mobile phone numbers.

Continuing with FIG. 14, the personnel background check may include steps for indicating when a check for a particular employee has not been performed within a specified period of time, such as five days (e.g., steps 336, 338, 340 and 342). Typically, it will also be desirable upon initiation of the background check to update the admin system (e.g., system 84) to reflect that information for a particular employee has been submitted to the background check process, as shown at 334.

At 344, the method includes performing the actual background check, which may include verifying certain data provided by the vendor, and or performing the various inquiries referenced above (criminal record check, etc.). The method may further include updating admin system 84 with the results of the check (e.g., at 346), and taking appropriate subsequent action depending on the results. Specifically, the vendor and the particular vendor employee may be notified of the results of the background check (e.g., at 348 and 350), and an opportunity to respond may be provided if the background check reveals deficiencies (e.g., at 350 and 352).

Figure 15:
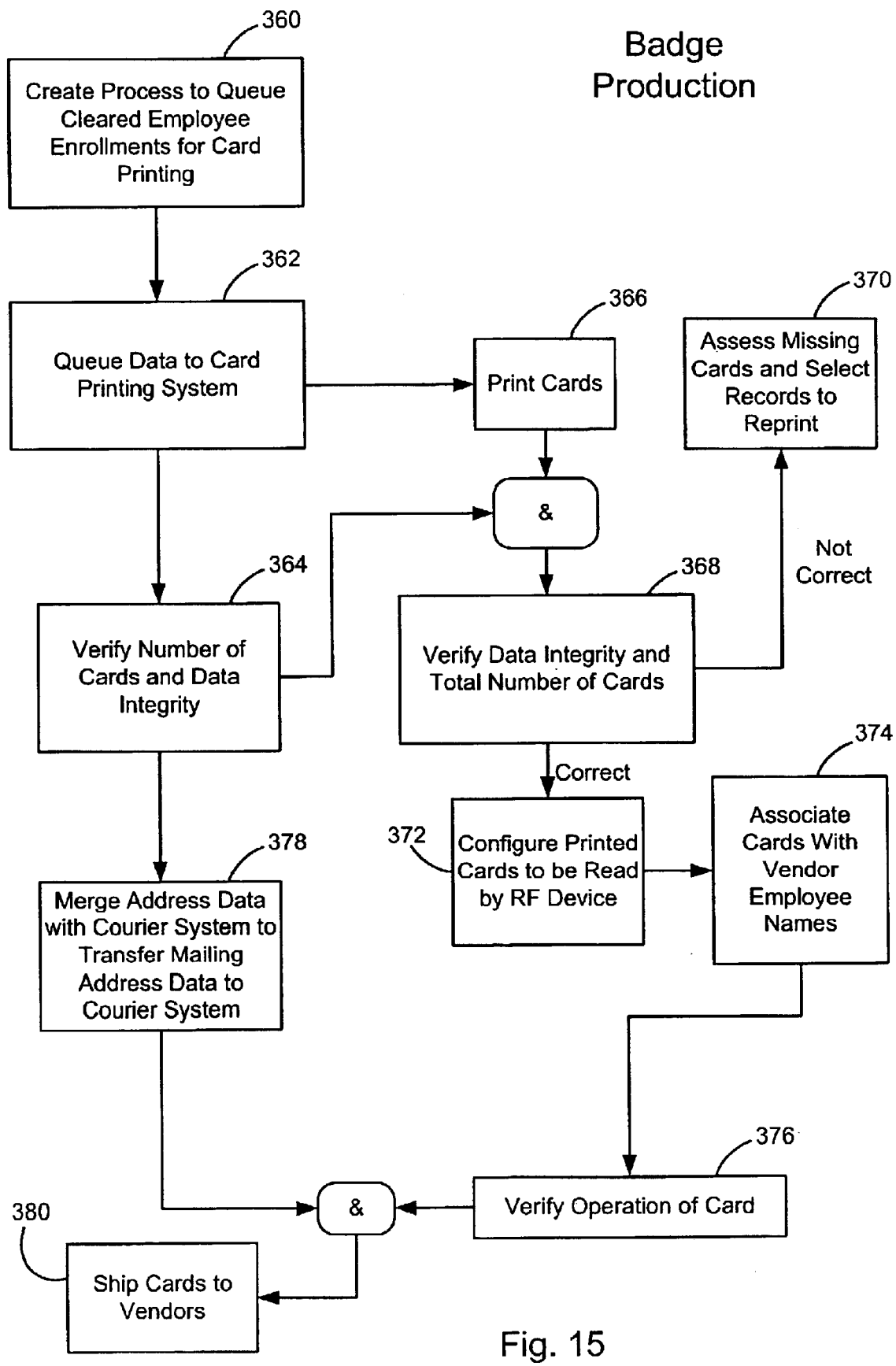
FIG. 15 depicts an exemplary method for producing security badges for approved vendor personnel.

Typically, after approval is obtained for vendor entities and vendor personnel, security cards or badges are generated for approved vendor personnel. FIG. 15 depicts an exemplary method implementation for generating security cards. As shown at 360, the method may include queuing approved employee enrollments for printing of security cards for the corresponding vendor employees. RFID cards manufactured by Wavetrend Inc. and card printing technology offered by Eltron Card Printer Products have proved suitable for use with the described systems and methods.

At 362, the data is queued to the actual card printing system, which typically is located by and/or operated by admin entity 74. Alternatively, the card printing equipment may be located at the sponsor's or vendor's location. At 364, the method may include verifying the total number of cards to be printed, and/or verifying the integrity of certain data to be printed. In many cases, it will be desirable to generate a hard copy report to facilitate this verification process. Such a report may be used, for example, by an operator of the card printing equipment. At 366, the card batch is run, and the printed cards may be reviewed to confirm that the correct number of cards has been printed, and to check the integrity of the printed data (e.g., using the report generated at step 364). If discrepancies are detected, such as at step 368, selected employee records may be selected for re-printing, as shown at 370.

Typically, the security cards will be configured for reading by a radio-frequency card reader or like device. For example, the security card may be configured to wirelessly transmit data via a carrier signal using various modulation techniques. Accordingly, the depicted exemplary method includes, at 372, configuring the card to enable a card reader (e.g., a security gate card reader employed within a sponsor's facility) to obtain pertinent data from the cards. Typically, this will involve creating an identifier unique to each card. At 374, the identifier is linked to the particular vendor employee to whom the card will be issued. Typically, the method also includes final verification of the card, as shown at 376, to ensure that the card is recognized by the card reader device, and to ensure that the card is linked with the appropriate employee data and causes display of the employee's photograph on a display associated with the card reader. Also, shipping of the security cards to the vendor entities (e.g., at 380) may be facilitated, as shown at 378, by merging vendor address data with a courier service designated to ship the cards to the vendors.

Figure 16:
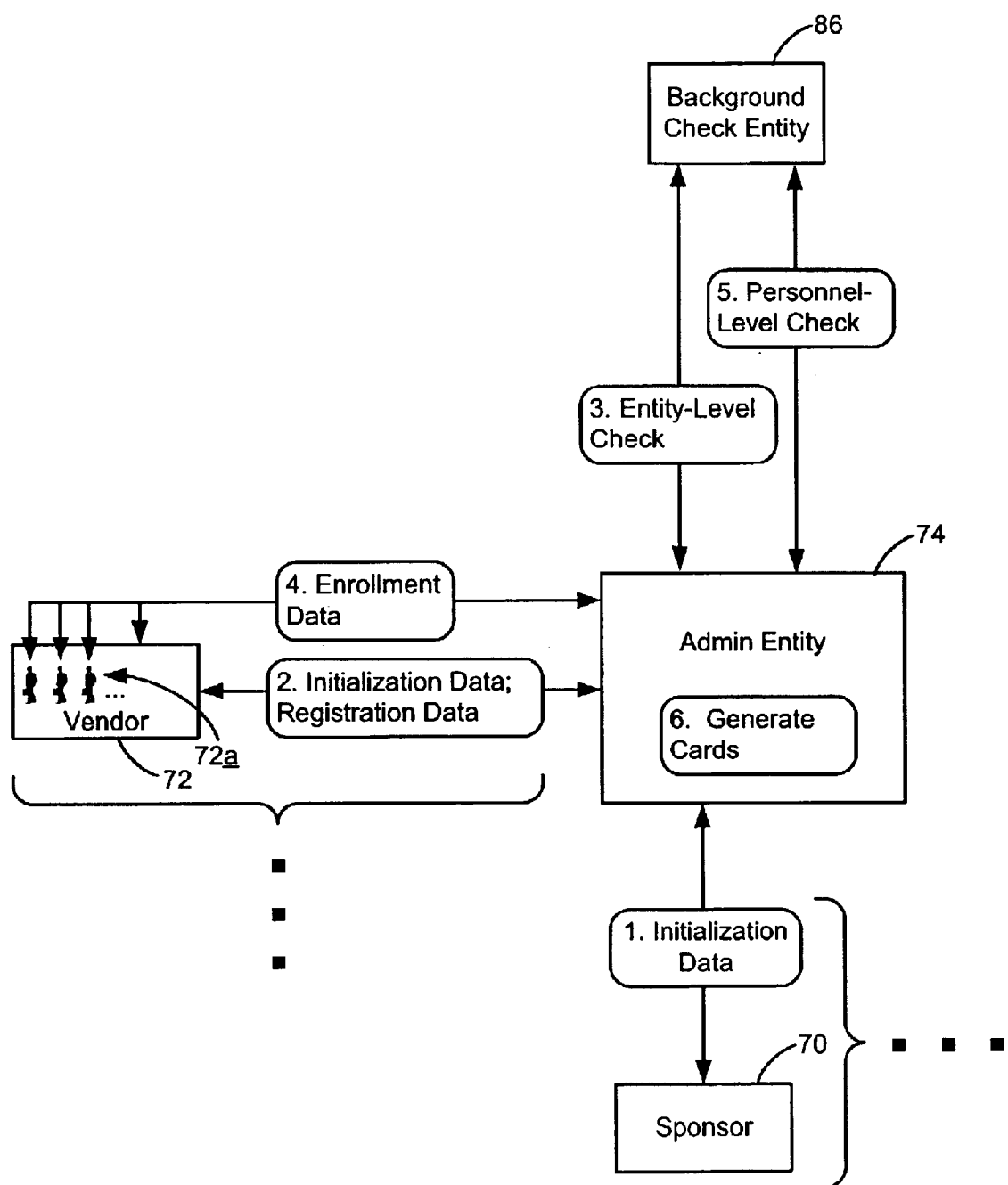
FIG. 16 depicts an exemplary method in which a centralized admin entity coordinates registration of vendor entities, enrollment of vendor personnel, background checks and production of security badges for approved vendor personnel.

FIG. 16 depicts a further example of a method that may be employed to register vendor entities, enroll vendor personnel, perform desired background checks, and otherwise configure the described security systems for implementation at sponsor locations. As indicated, the method first includes one or more sponsor entities providing preliminary information to admin entity 74. As discussed above, the preliminary information typically will include information about various vendor entities (maintenance companies, temporary staffing agencies, etc.) having personnel that are to access the sponsor's facility. The admin entity then interacts with the identified vendor entities (typically via networked computer systems) to obtain further information about the vendor entities. This information is then used by the admin entity to initiate an entity-level background check, which typically is performed by an outside contractor, such as background check entity 86.

After the entity-level background check clears, enrollment data may be obtained from specific vendor personnel (e.g., personnel 72a) that are to access sponsor locations. Again, admin entity 74 may use the obtained data to perform a personnel-level background check. After approvals are received for specific vendor employees, badges (e.g., security cards) may be generated and issued to respective vendor personnel.

As discussed above, admin entity 74 typically is a separate and distinct entity from the sponsor entities and the vendor entities. Indeed, in many implementations the admin entity will be a separate company specializing in managing personnel security for the physical facilities of other companies. The described systems and methods are highly flexible and cost effective, particularly when managed by a central security company. The security company can manage security for many different client companies (i.e., sponsor entities) that have security issues relating to outside companies and the employees of those outside companies. Typically, each client company will have a different roster of outside companies with which it does business, and specific security considerations will vary among different client companies and the different outside entities having access to their facilities. Some client companies, for example, may require more rigorous background checks of outside personnel than others. Certain types of vendor entities may be subject to special licensing or certification requirements specific to particular industries. The registration process and background checks described herein may be easily modified to address such special considerations.

Figure 17:
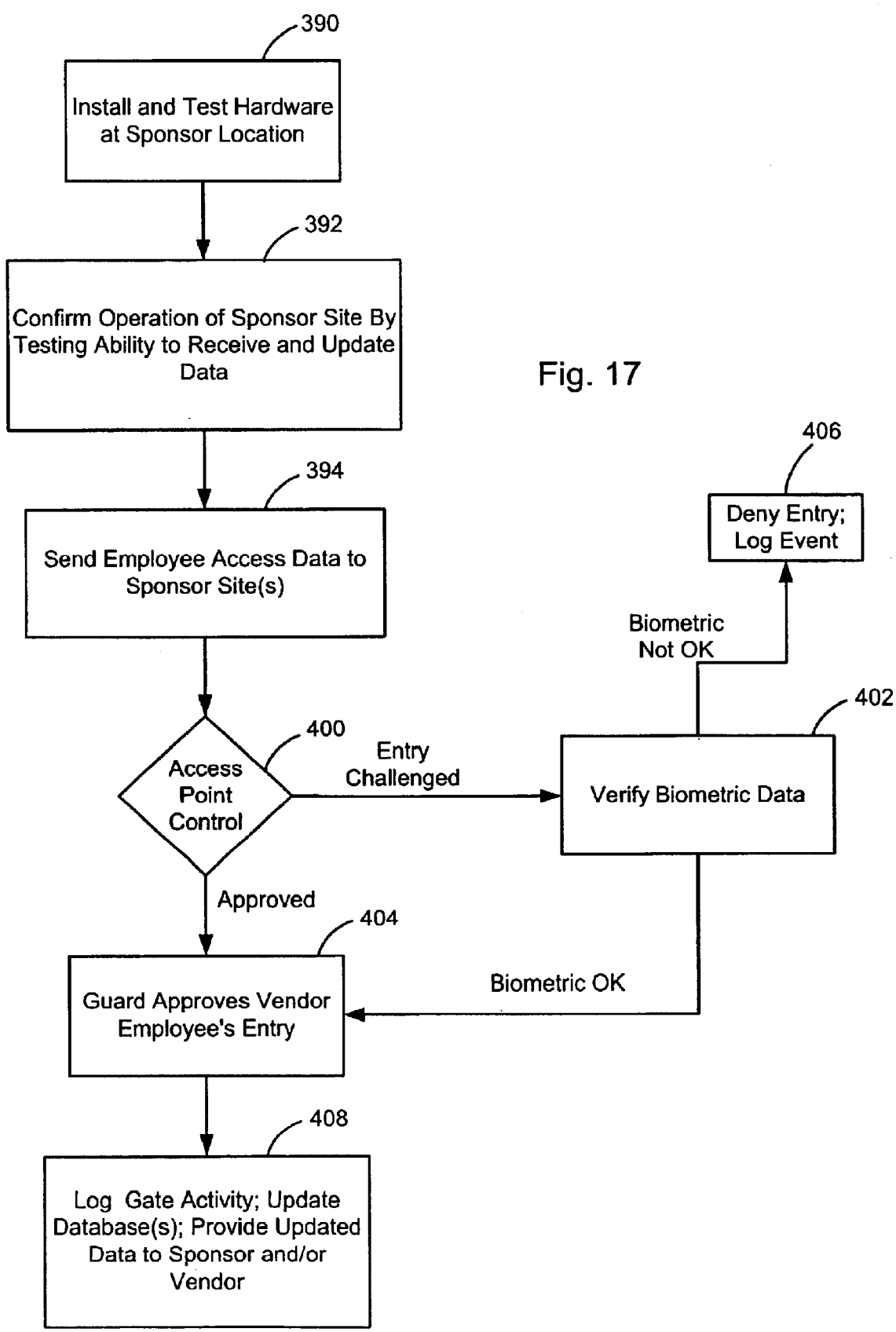
FIGS. 17 and 18 depict exemplary methods for implementing and operating the described security systems and methods at a sponsor entity's physical facility.
Figure 18:
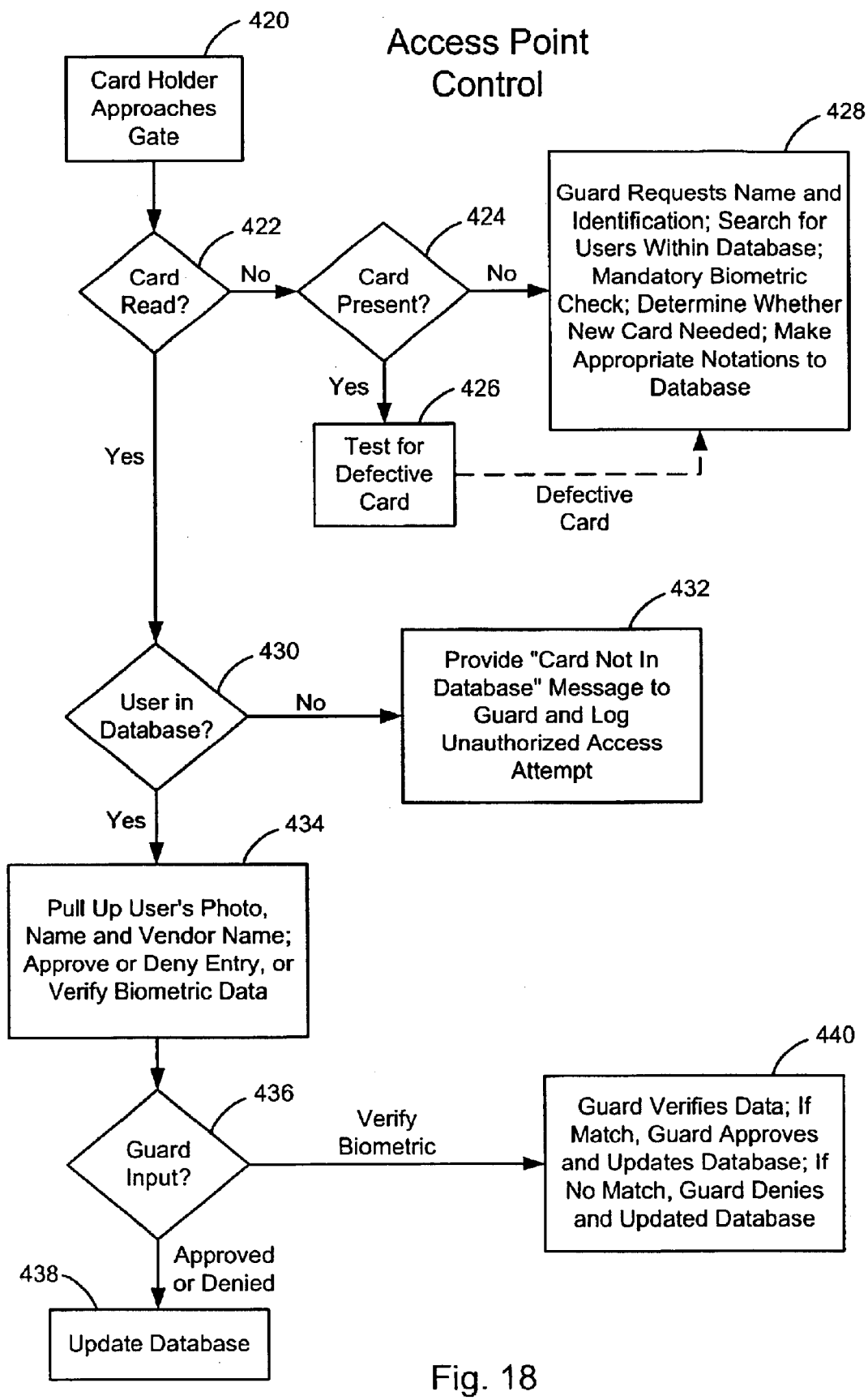

Referring now to FIGS. 17 and 18, those figures depict methods for operating security systems at a sponsor's physical facility. Prior to commencing regular operation, however, various hardware and software may be installed and tested at the sponsor site, as shown in FIG. 17 at 390 and 392. In implementations where a separate security company is used, such as admin entity 74, the separate company may assist the sponsor entities with installation and setup at their locations. This assistance may include surveying the sponsor's site, setting up biometric equipment; checking access points such as entry-exit gates, and providing client computers, servers, digital cameras, fingerprint scanners and other equipment to facilitate the various tasks discussed herein.

In typical implementations, the location at the sponsor site will include electronic devices configured to read identifier devices, such as the security cards discussed above. The reader devices may include radio-frequency identification (RFID) technology, and may be installed at fixed locations or deployed for mobile use at the sponsor site. Indeed, a portable reader device such as that depicted in FIG. 2 may be used by roving security personnel at the sponsor's facilities. Device 30 may be constructed using a personal digital assistance device (e.g., a handheld computer operating on a Palm™ or WinCE™ platform) configured with RFID capability, for example with an RFID add-on module.

Continuing with FIG. 17, once proper operation is confirmed, any relevant data maintained on admin system 84 may be transmitted (e.g., at 394) to the sponsor's security system, which typically will include a networked computer system installed at the sponsor's physical location. As discussed above with reference to FIGS. 4 and 5, the respective systems of the sponsor entities and admin entity 74 typically are linked via a network 90, such as the Internet. Once proper operation is confirmed and the relevant data has been downloaded, the security systems in place at the sponsor's location (e.g., security gates, secured entrances, card readers, card reader displays, networked computers, etc.) may then be employed to monitor and control access by vendor employees that have been issued security badges.

Beginning with step 400, FIG. 17 shows an example of access control being implemented at an access point within a sponsor's facility, such as security gate entrance 40 (FIG. 3). At step 400, the employee card is read and the stationed guard (or automated system) makes a decision about whether to approve or deny access to the employee based on the employee data that appears on the card reader display. If entry is initially challenged, entry may be approved after verification of biometric data using a fingerprint scanner or other suitable device, as shown at 402 and 404. If biometric verification fails, entry is denied at 406. As shown at 408, it typically will be desirable to continuously log activity at all access points within the sponsor location. Also, centralized database(s), such as that maintained by admin entity 74, may be periodically updated with the current data being made available to appropriate sponsor and vendor entities. In many implementations, it will be desirable to provide the security gate with a satellite dish or other telecommunications device, in order to efficiently transfer security gate data to admin system 84 or other computer systems.

FIG. 18 depicts another method implementation showing how access control may be achieved at a security gate or other access point within a sponsor's location. At steps 420 and 422 the card holder approaches the access point and the card is read by the read device, assuming a card is present. If a card is present, but initially unreadable, the card may be checked to determine whether it is defective, as shown at 424 and 426. If the card is defective, or if the person wanting access does not have a card with them, a manual security check may be performed, as shown at 428, which may include checking of name and identification, capturing biometric data, and making appropriate notations to be stored as logged activity. The stationed guard may also determine that a new card is needed and take appropriate steps to initiate the process of producing a card.

The method may also include, for cards that are read, determining whether there is a corresponding user or employee within the system database, as shown at 430. If there is no user in the database, the guard may log an unauthorized access attempt, at 432. If the card corresponds to a user that is present within the database, the card reader display presents the user's photograph and other appropriate data corresponding to the user, such as the name of the vendor associated with the user. Based on the data that is pulled up, the guard may approve or deny entry, verify biometric data, and appropriate updates may be logged into the system, as shown at 434, 436, 438 and 440.

The security operations discussed with reference to FIGS. 17 and 18 may be performed using a mobile device, such as the portable RFID device discussed above. A roving guard could perform personnel checks on personnel at various locations within the sponsor facility. In such a case, it may be desirable for security reasons to configure the portable device to promptly transmit recorded activity data to a secure location without retaining a local copy of the recorded data.

It should be appreciated that the present systems and methods are equally applicable to vehicles and other things that a vendor entity may bring to a sponsor's facility. These things may be addressed during the previously-described registration and enrollment process, and identifier devices (e.g., RFID security tags) may be provided where appropriate. The card reader devices previously discussed, whether fixed or mobile, could be used to monitor movement of the vehicles and other objects brought on to the sponsor's location.

Access may be provided to various users of the described security systems, so that the users may obtain reported information and perform various maintenance tasks. As indicated above, it typically will be desirable to implement the described systems with a centralized entity, such as admin entity, that performs many of the operations described herein. In such a case, the admin entity maintains and operates an admin system (e.g., admin system 84) that may be inter-operatively coupled with vendor systems and sponsor systems via a network 90, such as the Internet. In such an environment, the reporting and maintenance tasks may be performed by allowing system users to access admin system 84 via a browser interface configured to access the World Wide Web with a secure connection (e.g., using secure socket layer protocol). Alternatively, any other suitable interface mechanism may be employed.

In addition to a central computer system and associated database, the systems describe herein typically will also include distributed devices and databases at the sponsor locations. The centralized and distributed systems typically will include various types of computing devices similar to that described with reference to FIG. 5. One example of a distributed device at a sponsor's site would be a card reader station, including an associated computer, which is positioned at a secured entrance to an office building. The card reader station typically would be configured to store activity data pertaining to traffic through the secured entrance. This activity could be shared with other computer systems at the sponsor's location, for example via a local area network.

Regardless of the particular configurations employed at the distributed sponsor locations, it will normally be desirable to periodically synchronize the distributed systems with the central admin system (e.g., admin system 84). This ensures that system-wide data is kept current at a central location, so users accessing the admin system (e.g., via the above-mentioned browser interface) can view and act upon accurate data.

Specifically, the admin system may be configured to provide reports for viewing by the participating sponsor entities. The reports may include any type of information associated with access to a sponsor's location, including ingress/egress by particular vendors; ingress/egress by particular vendor employees; the specific locations within the sponsor site that were accessed; and the dates and times that the sponsor's location was accessed. Similar log information may be made available to the vendor entities. Additionally, it will also be desirable to provide vendor entities with access to billing information, and to information concerning specific vendor employee cards that have been deactivated by a particular sponsor. The web interface may also be used by sponsors to deactivate a vendor employee (e.g., by deactivating the employee's card) or wholly deactivate a vendor. The web interface may be used by vendors to approve background checks, as previously described, to deactivate cards of its employees, or to order replacement cards as necessary. Typically the admin system will include user-specific accounts to appropriately limit sponsor and vendor access to appropriate portions of the stored data.

While the present embodiments and method implementations have been particularly shown and described, those skilled in the art will understand that many variations may be made therein without departing from the spirit and scope defined in the following claims. The description should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

What is claimed is:

1. A method of managing personnel security for a plurality of different client companies from a centralized security company, the method comprising:

obtaining screening data from a plurality of different outside companies and their employees, where the screening data is obtained to screen the outside companies and their employees to determine whether the outside companies and their employees should be granted physical access to facilities of the client companies;

performing background checks on the outside companies and their employees based on the screening data, where the background checks are initiated by the security company using a computer-based system operated and maintained by the security company;

producing security badges for employees of the outside companies upon successful completion of background checks for those employees; and conducting periodic communications between the computer-based security system of the security company and distributed electronic security systems deployed at the client companies, where such periodic communications are conducted to upload activity data to the security company, and where the activity data pertains to activity occurring at access points within the physical locations of the client companies.

2. The method of claim 1, where the access points include secured entrances equipped with scanning devices configured to read the security badges.

3. The method of claim 1, further comprising providing the client companies and outside companies with selective access to the activity data that has been uploaded to the security company.

4. A method of managing personnel security for a plurality of different client companies from a centralized security company, the method comprising:

obtaining screening data from a plurality of different outside companies and their employees, where the screening data is obtained to screen the outside companies and their employees to determine whether the outside companies and their employees should be granted physical access to facilities of the client companies; and performing background checks on the outside companies and their employees based on the screening data, where the background checks are initiated by the security company using a computer-based system operated and maintained by the security company, where for each outside company, the background check for the outside company is performed prior to obtaining screening data for the employees of that outside company, and then, after successful completion of the background check, screening data is obtained from the employees and personnel-level background checks are performed on those employees.

5. A system for managing implementation of personnel security at a plurality of physical locations, where such physical locations are associated with and maintained by different sponsor entities, the system comprising:

a computer-based administrator system, where the computer-based administrator system is configured to be remotely accessible to users via a web interface, and where the computer-based administrator system is further configured to:

receive data from the sponsor entities pertaining to particular vendor entities that are candidates for gaining physical access to the physical locations associated with the sponsor entities:

receive data from the vendor entities so as to register the vendor entities with the computer-based administrator system; and initiate background checks of personnel associated with the vendor entities that are to have physical access to the physical locations of the sponsor entities;

initiate production of security badges for personnel associated with the vendor entities that have successfully passed the background checks;

communicate with selected sponsor entities to upload activity data into the computer-based administrator system, where such activity data pertains to activity occurring at access points in the physical locations of the sponsor entities.

6. The system of claim 5, where the access points include secured entrances equipped with reader devices configured to read the security badges.

7. The system of claim 5, where the activity data is stored within a database of the computer-based administrator system, and where the computer-based administrator system is configured to provide selective access to the database to enable sponsor entities and vendor entities to view portions of the activity data that correspond to those sponsor entities and vendor entities.

* * * * *